US005787252A

United States Patent [19]
Schettler et al.

[11] Patent Number: 5,787,252
[45] Date of Patent: Jul. 28, 1998

[54] FILTERING SYSTEM AND METHOD FOR HIGH PERFORMANCE NETWORK MANAGEMENT MAP

[75] Inventors: Robert Dwight Schettler; Eric A. Pulsipher; Brian J. Atkins. all of Fort Collins, Colo.

[73] Assignee: Hewlett-Packard Company. Palo Alto, Calif.

[21] Appl. No.: 551,499

[22] Filed: Nov. 1, 1995

[51] Int. Cl.⁶ .................................................. G06F 15/177
[52] U.S. Cl. .................. 395/200.54; 345/335; 395/284; 395/830; 395/200.1; 395/828; 711/170
[58] Field of Search .................. 395/497.01, 284, 395/200.1, 653, 828, 830, 832, 834, 200.54; 345/333, 334, 335

[56] References Cited

U.S. PATENT DOCUMENTS

| 4,107,784 | 8/1978 | Van Bemmelen | 345/337 |
| 5,021,976 | 6/1991 | Wexelblat et al. | 345/356 |
| 5,185,860 | 2/1993 | Wu | 395/200.54 |
| 5,438,659 | 8/1995 | Notess et al. | 345/335 |
| 5,603,034 | 2/1997 | Swanson | 395/701 |
| 5,627,979 | 5/1997 | Chang et al. | 345/335 |

Primary Examiner—Tod R. Swann
Assistant Examiner—J. Peikari

[57] ABSTRACT

Discovery/layout software configures a general purpose computer system to act as a management station using an industry standard SNMP protocol. The discovery/layout software has a discovery mechanism and a layout mechanism which, in combination, permit the discovery/layout software to provide various submaps to a display for illustrating network topology, which includes devices and device interconnections of a network. The submaps correspond to various hierarchical views of a network. Significantly, one or more filtering systems are provided in the discovery/layout software for filtering objects to be displayed within the submaps. The filtering systems reduce clutter in the submaps, reduce memory usage and associated expense, and reduce interprocess communication (context switching) to achieve higher performance.

31 Claims, 25 Drawing Sheets

5,787,252

1

FILTERING SYSTEM AND METHOD FOR HIGH PERFORMANCE NETWORK MANAGEMENT MAP

FIELD OF THE INVENTION

The present invention generally relates to data communication networks and, more particularly, to a filtering system and method for permitting high performance generation of a network management map of a data communication network in a management station.

BACKGROUND OF THE INVENTION

A data communications network generally includes a group of devices, for instance, computers, repeaters, bridges, routers, etc., situated at network nodes and a collection of communication channels for interconnecting the various nodes. Hardware and software associated with the network and particularly the devices permit the devices to exchange data electronically via the communication channels.

The size of networks varies. A local area network (LAN) is a network of devices in close proximity, typically less than one mile, and usually connected by a single cable, for instance, a coaxial cable. A wide area network (WAN) is a network of devices which are separated by longer distances, often connected by, for example, telephone lines or satellite links. In fact, some WANs span the U.S. as well as the world. Furthermore, many of these networks are widely available for use by the public, including commonly universities and commercial industries.

A very popular industry standard protocol for data communication along the networks is the Internet Protocol (IP). This protocol was originally developed by the U.S. government's Department of Defense, and has been dedicated for public use by the U.S. government. In time, the Transmission Control Protocol (TCP) and the Unreliable Datagram Protocol (UDP) were developed for use with the IP. The former protocol (TCP/IP) is a protocol which guarantees transfer of data without errors, as it implements certain check functionality, and the latter protocol (UDP/IP) is a protocol which does not guarantee transfer of data, but requires much less overhead than the TCP/IP platform. Furthermore, in order to keep track of and manage the various devices situated on a network, the Simple Network Management Protocol (SNMP) was eventually developed for use with a UDP/IP platform. The use of the foregoing protocols has become extensive in the industry, and numerous vendors now manufacture many types of network devices which can employ these protocols.

Some management stations have on-demand submap capabilities. One such example is Hewlett-Packard's "OPENVIEW"™. In on-demand submap systems, a submap corresponds with each view of the network to be displayed. The network management map is the collection of all submaps. In these on-demand submap systems, and particularly the "OPENVIEW"™ system, the user specifies which submaps the user wishes to have available, and hence, specifies the submaps which are resident within the map. Moreover, the user can also open, or "explode," a submap during operation even though it is not specified as resident in the map. In this case, the submap is generated immediately from the topology data when the user prompts the manager station to open the submap, hence the name on-demand.

Although the presently available SNMP management stations are meritorious to an extent, the art of SNMP management stations is still in the state of infancy, and the performance of these management stations can still be enhanced and optimized. A specific area where optimization is envisioned involves customizing the network management map. Currently, a network topology is discovered, and all this topology information is displayed in the network management map. This predicament results in clutter of objects in the submaps and in dilution of the functionality pertaining to each submap. Furthermore, this situation results in unnecessary usage of memory space with resultant undesirable expense and excessive interprocess communication, or context switching, which degrades performance.

Thus, a need exists in the industry for a system and method for better customizing the contents of the network management map for a management station for the purpose of reducing object clutter, minimizing memory requirements, and minimizing expense, and optimizing performance (including speed).

SUMMARY OF THE INVENTION

Briefly described, the present invention is a filtering system and method for a management station for customizing the contents of a network management map. The system comprises a processor which executes the instructions provided by the various software elements of the system, a memory for storing the various software elements, a display for showing the devices and interconnections of the network, an interface that interconnects the foregoing elements and the network, a discovery mechanism for determining the network topology data, a layout mechanism for converting the network topology data to map data and for driving the display with the map data, and a filtering system, which is a significant feature of the present invention as will be further described immediately hereafter.

The filtering system can be situated in one or more of three possible locations in the management station. First, the filtering system can be situated between the discovery mechanism and the layout mechanism so that the filtering system filters objects within the topology data that pass from the discovery mechanism to the layout mechanism. Second, the filtering system can also be situated between the layout mechanism and the network so that the filtering system filters objects within the topology data that pass from the network to the discovery mechanism. Third, the filtering system can also be situated between discovery mechanisms so that the filtering system filters objects within the topology data that passes between the discovery mechanisms.

In an implementation where more than one filtering system is employed, it is desirable that the filtering systems utilize a common filtering library, which contains the filtering specification pertaining to the objects. The filtering specification associated with each filtering system can include a list of one or more objects to be allowed or disallowed, a boolean expression (or equation) defining which objects are to be allowed or disallowed, or any other mechanism for specifying a filtering condition.

The filtering system and method of the present invention has numerous other advantages, a few of which are delineated hereafter, as examples.

Another advantage of the filtering system and method is that they customize the contents of a network management map generated by a management station so as to reduce clutter of objects in submaps.

Another advantage of the filtering system and method is that they minimize memory requirements as well as resultant expense for generating a network management map in a management station.

Another advantage of the filtering system and method is that they enhance the performance of a process for generating a network management map in a management station.

Another advantage of the filtering system and method is that they minimize requisite processing time for producing a network management map in a management station.

Another advantage of the filtering system and method is that they minimize requisite interprocess communication in a management station for generating a network management map of a data communications network.

Another advantage of the filtering system and method is that they are simple in design and easy to implement.

Another advantage of the filtering system and method is that they are efficient as well as reliable in operation.

Other features and advantages of the present invention will become apparent to one with skill in the art upon examination of the following drawings and detailed description. All such additional objects, features, and advantages are intended to be included herein within the scope of the present invention, as is defined in the claims.

BRIEF DESCRIPTION OF THE DRAWINGS

The present invention can be better understood with reference to the following drawings taken in the context of the text. The drawing elements are not necessarily to scale relative to each other, emphasis instead being placed upon clearly illustrating principles of the present invention. Further, like reference numerals designate corresponding parts throughout the several views.

DETAILED OF THE PREFERRED EMBODIMENTS

The filtering system of the present invention can be stored on any computer-readable medium for use by or in connection with a computer-related system or method. In the context of this document, a computer-readable medium is an electronic, magnetic, optical, or other physical device or means that can contain or store a computer program for use by or in connection with a computer-related system or method. Thus, for example, the novel filtering system can be stored and transported on a portable diskette, or as another example, the filtering system could be stored in the memory of a computer for the purpose of driving the computer when called upon.

Figure 1:
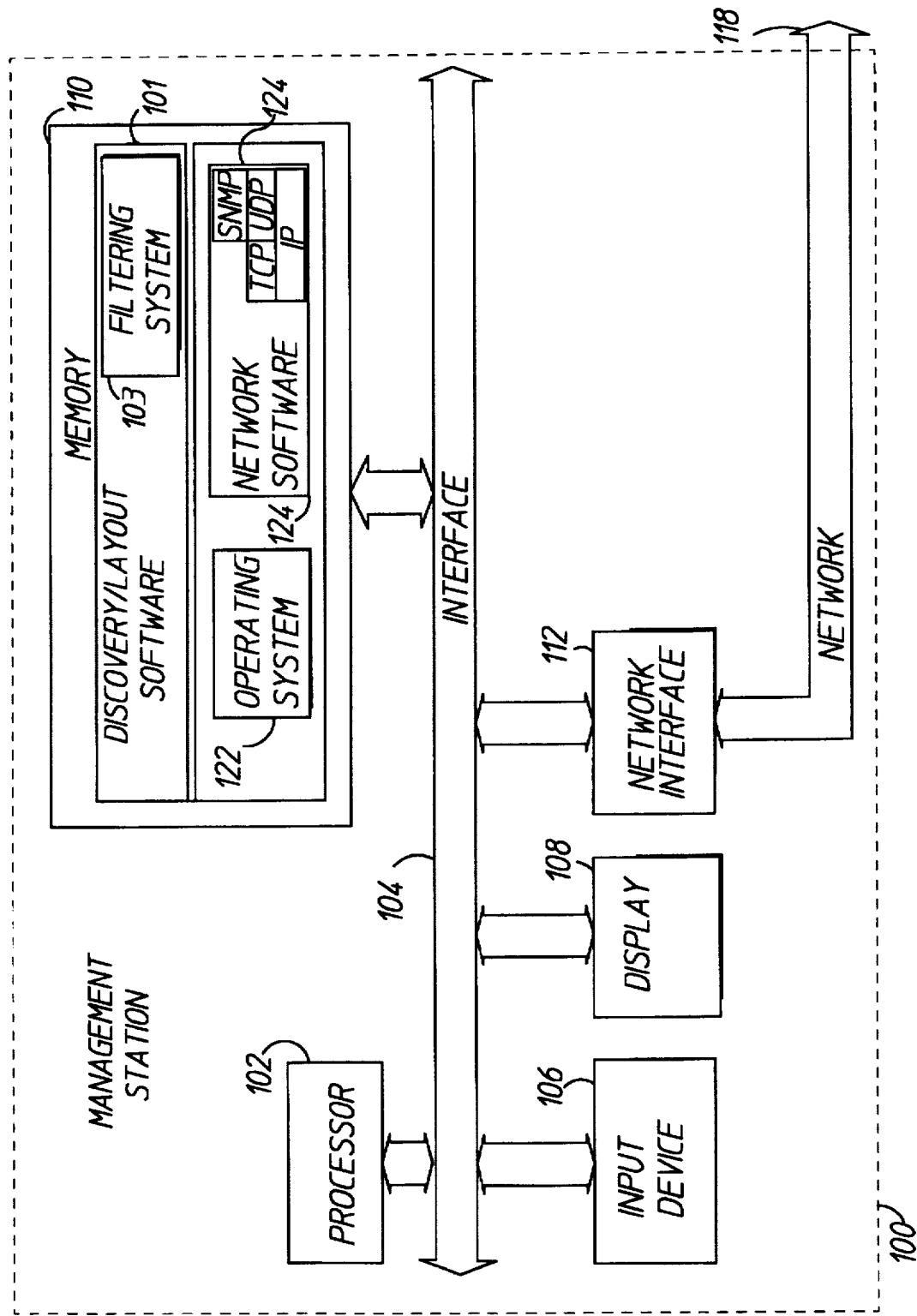
FIG. 1 is a block diagram of a management station having discovery/layout software which employs the filtering system and method of the present invention.

FIG. 1 shows a block diagram of an object-oriented management station 100 which is implemented with a general purpose computer system containing discovery/layout software 101, which employs the filtering system and associated methodology of the present invention. The novel filtering system is designated by reference numeral 103 in FIG. 1. With further reference to FIG. 1, the management station 100 contains a conventional processor 102. The processor 102 communicates to other elements within the management station 100 over an interface 104, such as a bus or bus network. An input device 106, for example, a keyboard or mouse, is used to input data from a user of the management station 100, and a display 108 is used to output data to the user. A network interface 112 is used to interface the management station 100 to a network 118 in order to allow the management station 100 to act as a node on a network 118. A memory 110 within the management station 100 contains discovery/layout software 101. The discovery/layout software 101 communicates with a conventional operating system 122 and conventional network software 124 to discover the nodes on the network 118. The network software 124 serves as the intelligence, including validation, for the data communication protocols. As shown in FIG. 1, in the preferred embodiment, the network software implements the IP, the TCP and UDP over the IP, and the SNMP over the UDP. All of the foregoing protocols are well known in the art.

The discovery/layout software 101 implements object-oriented functionality. In the context of SNMP managers and this document, object-oriented means that most of the management system actions and processes that the user can invoke are oriented toward a class of devices rather than individually managed network nodes.

Figure 2:
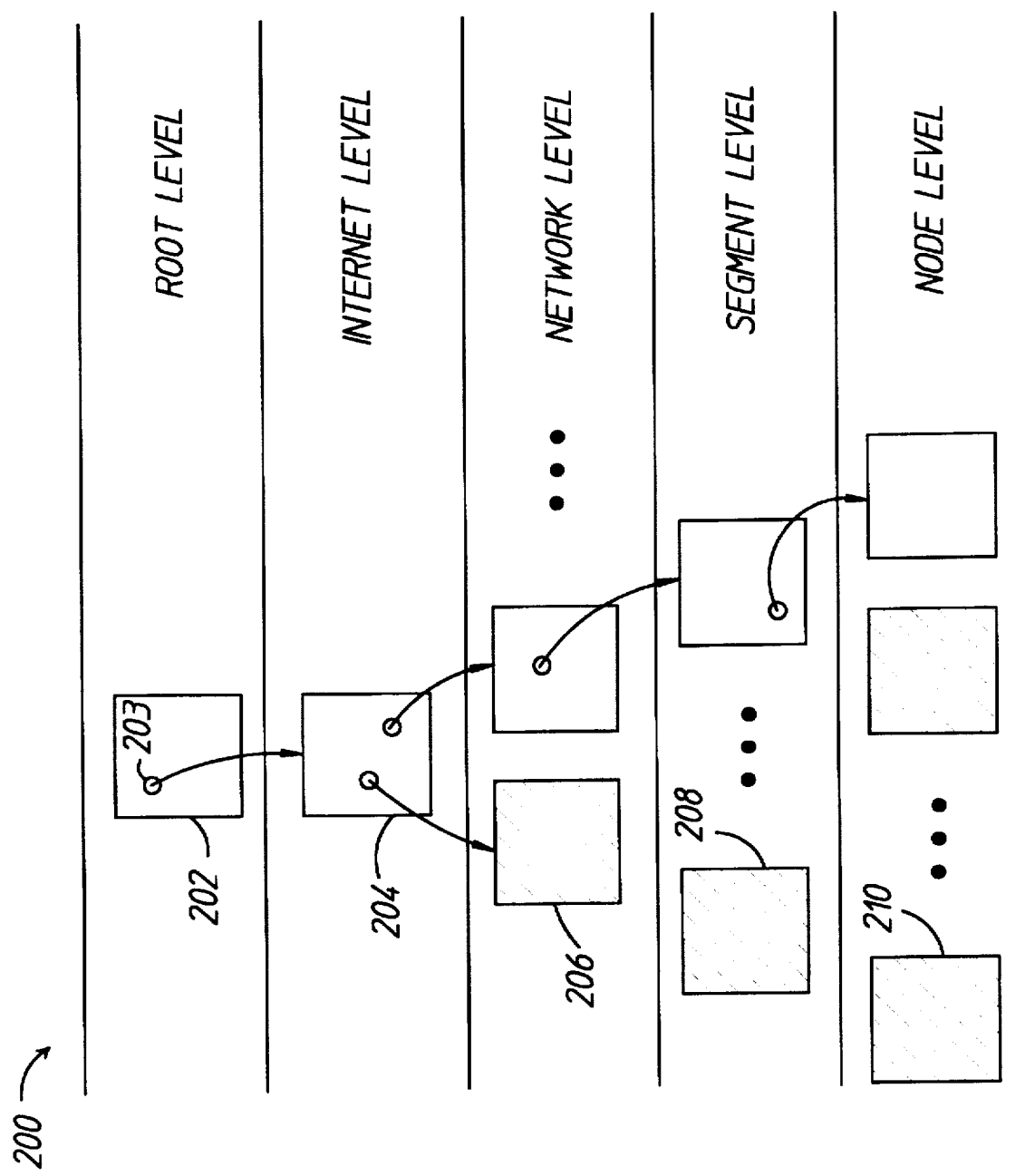
FIG. 2 is a schematic diagram illustrating a network management map, which comprises a collection of submaps, any of which can be displayed on the display of the management station by the discovery/layout software of FIG. 1.

Generally, the discovery/layout software 101 of FIG. 1 is configured to discover the network topology, that is, network nodes and node interconnections existing on the network 118, and to construct a network management map comprising various submaps, any of which can be used for displaying the network topology on the display 108. FIG. 2 shows a network management map 200 which is generated by the discovery/layout software 101 from topology data discovered from the network 118. The discovery/layout software 101 can drive any of the various submaps to the display 108 (FIG. 1) for viewing by the user.

The submaps in the map 200 of FIG. 2 are arranged in a hierarchy. A root submap 202 is defined at a root level. The root submap 202 represents the highest logical level submap in the hierarchy and shows objects 203 acting as anchor points for different submap hierarchies. Each hierarchy is a separate management domain. This could be, for instance, a network, logical grouping of nodes, or some other domain. An internet submap 204 is defined at an internet level and is generated by "exploding" an object 203 within the root submap 202. "Exploding" in the context of this document means that the user prompts the management station 100 with the input device 106 to break down and provide more data pertaining to the object 203 at issue. Further, the internet submap 204 illustrates objects 203 in the form of networks and routers. Any one of a number of network submaps 206 can be exploded from the internet submap 204. Each network submap 206 shows objects 203 in the form of segments and connectors. Any one of a number of segment submaps 208 can be exploded from an object 203 within a network submap 206. Each segment submap 208 shows objects in the form of network nodes. Finally, any one of a number of node submaps 210 can be exploded from an object 203 within a segment submap 208. Each node submap 210 shows objects 203 in the form of interfaces within that node.

In the preferred embodiment, although not necessary to practice the present invention, the discovery/layout software 101 implements on-demand submaps in order to save memory and processing time. The concept of on-demand submaps is to only place those submaps in the map 200 of FIG. 2 which the user wants to see. The net result is that only a portion of the submap hierarchy is in the network management map 200 at a given time. In FIG. 2, submaps (nonresident) which are not present, but would be created upon prompting by the user, are indicated by hatching. The resident submap subset of the hierarchy will change over time as the user traverses the submap hierarchy and causes nonresident submaps to be created.

A. First Embodiment Of The Discovery/Layout Software

Figure 3:
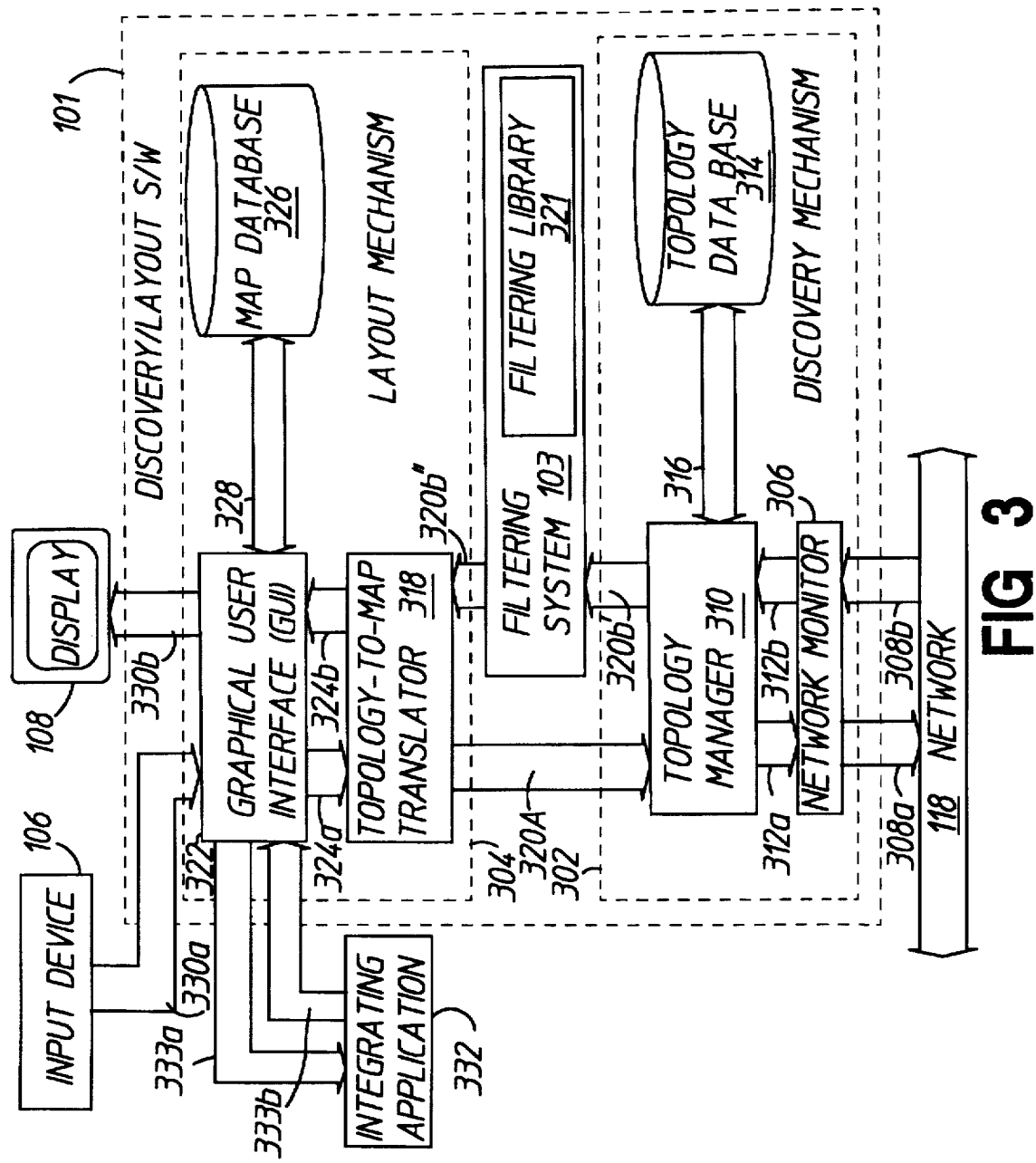
FIG. 3 is a block diagram of a first embodiment of the management station of FIG. 1 wherein the novel filtering system is situated between a layout mechanism and a discovery mechanism.

A high level block diagram of a first embodiment of the discovery/layout software 101 (FIG. 1) is set forth in FIG. 3. With the exception of the filtering system 103, the architecture of the discovery/layout software 101 in FIG. 3 is essentially the same as or similar to the architecture of Hewlett-Packard Company's well known and commercially available management software package called "OPENVIEW."™

As shown in FIG. 3, at a general architecture level, the discovery/layout software 101 comprises a discovery mechanism 302 for discovering nodes and interconnections of the network 118 and a layout mechanism 304 for receiving topology data from the discovery mechanism 302 and for generating the map 200 (FIG. 2) for driving the display 108. Moreover, one or more integrating applications 332 may communicate display and map information with the layout mechanism 304.

The discovery mechanism 302 has a network monitor 306 connected to the network 118 as indicated by connections 308a, 308b, a topology manager 310 connected to the network monitor 306 as indicated by arrows 312a, 312b, and a topology data base 314 in communication with the topology manager 310 as indicated by arrow 316.

The network monitor 306 transmits and receives data packets to and from the network 118. The network monitor 306 discovers and monitors network topology, as indicated by arrows 308a, 308b. When network topology changes on the network, the network monitor 306 generates events, or traps (SNMP vernacular), which include an object identifier and object change information. The network monitor 306 can also receive events from other devices, such as a router, in the network 118. The network monitor 306 interacts with the network 118 by way of the network software 124 (FIG. 1), which essentially comprises protocol stacks, corresponding to IP, TCP, UDP, and SNMP in the preferred embodiment, and which generally implements these protocols and performs validation functions. Furthermore, the network monitor 306 populates the topology data base 314 by way of the topology manager 310 and notifies the topology manager 310 of events (topology changes). Finally, it should be noted that U.S. Pat. No. 5,185,860 to Wu, which is incorporated herein by reference, describes a node discovery system which could be employed to implement the network monitor 306 herein.

The topology manager 310 manages the topology data base 314, as indicated by bidirectional arrow 316. The topology manager 310 prompts the network monitor 306 to update topology data related to particular events, as indicated by arrow 312a, and receives topology updates, as indicated by arrow 312b.

The topology data base 314 stores topology data based upon objects, which are used to partition the network for logical reasons. Objects include, for example but not limited to, a network, a segment, a computer, a router, a repeater, a bridge, etc. Moreover, the topology data stored with respect to the objects includes, for example but not limited to, an interface or device address, an interface or device type, an interface or device manufacturer, and whether an interface or device supports the SNMP.

The filtering system 103 receives topology data from the topology manager 310 as indicated by arrow 320b', filters the topology data, and passes the processed data to the layout mechanism 304, as shown by arrow 320b". The filtering system 103 maintains a filtering library 321, which specifies which objects within the topology data are to be communicated from the discovery mechanism 302 to the layout mechanism 304. In essence, the library determines whether objects are allowable objects or nonallowable objects. Moreover, allowable objects are ultimately converted into map data and displayed, whereas nonallowable objects are not converted into map data and are not displayed.

Although not required for practicing the present invention, in the preferred embodiment, the filtering library contains a listing of filter names that are organized in three groups, namely, sets, filters, and filter expressions, which are described briefly hereafter.

A set is simply a list of strings. The only operation available on sets is the test for membership (which can be prefaced with the boolean NOT operator). Set members may be enumerated in the filter file itself, or may be listed in a separate file. Any set member beginning with a slash (/) is assumed to be the name of a file where set members are listed, one per line. Files in number strings can be mixed in the same set definition.

Filters are boolean expressions of database fields and values. Any suitable set of boolean expressions can be utilized within the filters. In the preferred embodiment, the boolean operators include the following: "==" for "equal"; "!=" for "not equal"; "<" for "less than"; "<=" for "less than or equal"; ">" for "greater than"; ">=" for greater than or equal"; "~" for "approximately equal"; and "!~" for "not approximately equal." Moreover, the operands that are combined by the aforementioned boolean operators are either a field name or a literal value to which database field values are compared.

A filter expression allows multiple filters to be applied to a set of objects without requiring a new filter which is just the logical combination of others. The only valid operands in a filter expression are filters previously defined in the same filter file. Further, any suitable set of boolean expressions can be utilized within the filter expressions. In the preferred embodiment, the boolean operators that are used in the filter expressions are different than those that are used in the filters. Specifically, the following boolean expressions are utilized in the filter expressions: "||" for "or"; "&&" for a "and"; "!" for "not"; and "("and ")" which are utilized to help define the order for operand processing.

Essentially, these groups represent three different ways for a user to specify the filtering specification, the way depending upon the type of object to be filtered. The language for the filtering library 321 in the preferred embodiment is set forth hereafter in Table A. The listing in Table A is referred to herein as the filter definition file grammar, and it is maintained in the memory 110 (FIG. 1).

TABLE A-continued

| | |
|---|---|
| Memberlist | ::= Member__Stmt |
| | \| Memberlist "," Member__Stmt |
| Member__Stmt | ::= StringOrIdentifier |
| | \| <file specification> |
| Filters | ::= "Filters" "{" Filter__Stmts "}" |
| | \| "Filters" "{" "}" |
| Filter__Stmts | ::= Filter__Stmt |
| | \| Filter__Stmts Filter__Stmt |
| Filter__Stmt | ::=FilterName Description "{" Expression "}" |
| Expression | ::= Expression "&&" Expression |
| | \| Expression "\|\|" Expression |
| | \| "!" Expression |
| | \| "(" Expression ")" |
| | \| BoolExpr |
| | \| SetExpr |
| BoolExpr | ::= Field Name |
| | \| FieldName ExprOperator <string> |
| | \| FieldName ExprOperator <integer> |
| | \| FieldName PatternOperator <ip__address> |
| | \| FieldName PatternOperator <snmp__oid> |
| SetExpr | ::= FieldName "IN" SetName |
| FilterExprs | ::= "FilterExpressions" "{" FilterExpr__Stmts "}" |
| | \| "FilterExpressions" "{" "}" |
| FilterExpr__Stmts | ::= FilterExpr__Stmt |
| | \| FilterExpr__Stmts Filter Expr__Stmt |
| FilterExpr__Stmt | ::= FilterExprName Description "{" FiltExpr "}" |
| FiltExpr | ::= FiltExpr "&&" FiltExpr |
| | \| FiltExpr "\|\|" FiltExpr |
| | \| "!" FiltExpr |
| | \| "(" FiltExpr ")" |
| | \| FilterName |
| FieldName | ::= StringOrIdentifier |
| ExprOperator | ::= "==" \| "!=" \| "<" \| "<=" \| ">" \| ">=" |
| PatternOperator | ::= "==" \| "!=" \| "~" \| "!~" |
| FilterExprName | ::= <identifier> |
| FilterName | ::= <identifier> |
| SetName | ::= <identifier> |
| StringOrIdentifier | ::= <string> \| <identifier> |
| Description | ::= <string> |

An example of a filter file that is used by the filtering library 321 is set forth hereafter:

TABLE B

```
Sets {
    CriticalNodes "Any critical nodes" { ov1, /var/openview/critical.nodes }
    BackboneNodes "Backbone routers" { /var/openview/backbone.nodes }
}
Filters {
    Router "" { isRouter == TRUE }
    Level2Conn "Any level 2 connector "{ is Bridge == TRUE && isHub == TRUE }
    MultiIF "Multiple Interfaced nodes" { numInterfaces > 1 }
    Critical "" {ipHostname in CriticalNodes }
    Backbone "" {ipHostname in BackbonesNodes }
    AdminNode "" { ipAddress ~ 15.2.111.* }
}
Filter Expressions {
    Connectors "All network connectors" {Router && Level2Conn }
    MultiSegmentHosts "Nodes an several segments" {Level2Conn && MultiHomed }
    BackboneNodes "All nodes on the backbone" { Router \|\| Backbone }
}
```

TABLE A

| | |
|---|---|
| Filter__File | ::= Sets Filters FilterExprs |
| Sets | ::= SETS "{" Set__Stmts "}" |
| | \| SETS "{" "}" |
| Set__Stmts | ::= Set__Stmt |
| | \| Set__Stmts Set__Stmt |
| Set__Stmt | ::= SetName Description "{" Memberlist "}" |

As shown in Table B, the filters are divided into three groups, namely, sets, filters, and filter expressions.

In the example of Table B, the following are filter names: CriticalNodes, BackboneNodes, Router, Level2Conn, MultiIF, Critical, Backbone, AdminNode, Connectors, MultiSegmentHosts, and BackboneNodes. In this example, CriticalNodes, for instance, are specified as the node "ov1" and a file "/var/openview/critical.nodes," and therefore, the foregoing nodes are allowable and will be communicated by the filtering system 103. Further, in this example, the filter expression "Connectors," for instance, is allowable when the filter expression "Router && Level2Conn" is true, i.e., when both Router and Level2Conn are true, or allowable.

The layout mechanism 304 has a topology-to-map translator 318 in communication with the filtering system 103 as indicated by unidirectional arrow 320b" and the topology manager 310 as indicated by unidirectional arrow 320a, a graphical user interface (GUI) 322 in communication with the topology-to-map translator 318 as indicated by arrows 324a, 324b, and a map data base 326 in communication with the GUI 322 as indicated by bidirectional arrow 328. The integrating application 332 communicates information with the GUI 322, as indicated by arrows 333a, 333b.

It should be noted that the network monitor 306, the topology manager 310, the translator 318, and the GUI 322 take turns utilizing the combination of the operating system 122 (FIG. 1) and the processor 102 (FIG. 1) in order to accomplish their respective functions. A "context switch" as used herein refers to a change in control of the system 122 and/or processor 102 by the foregoing software elements.

The translator 318 converts topology data from the topology data base 314 to map data and constructs the various submaps 202–210 in the network management map 200 of FIG. 2. The translator 318 can forward a request to the topology manager 310, as indicated by arrow 320a, in order to obtain topology data regarding particular objects. Moreover, in addition to forwarding topology data to the translator 318 upon request, the topology manager 310 advises the translator 318, by way of filtering system 103 as indicated by the arrows 320b', 320b", when topology data has changed based upon an event so that the translator 318 can make any appropriate changes in the submaps.

The GUI 322 manages the map data base 326, as indicated by the bidirectional arrow 328, and manages the display 108 and input device 106, as indicated by the arrows 330a, 330b. The GUI 322 receives map updates from the translator 318, as indicated by arrow 324b, and submits user-triggered events to the translator 318, as indicated by arrow 324a. A user-triggered event includes a prompt 330a from a user to explode an object, as described relative to FIG. 2. Finally, it should be noted that U.S. Pat. No. 5,276,789 to Besaw et al., which is incorporated herein by reference, describes a graphical user interface which could be employed to implement the GUI 322 herein.

B. Second Embodiment Of The Discovery/Layout Software

Figure 4:
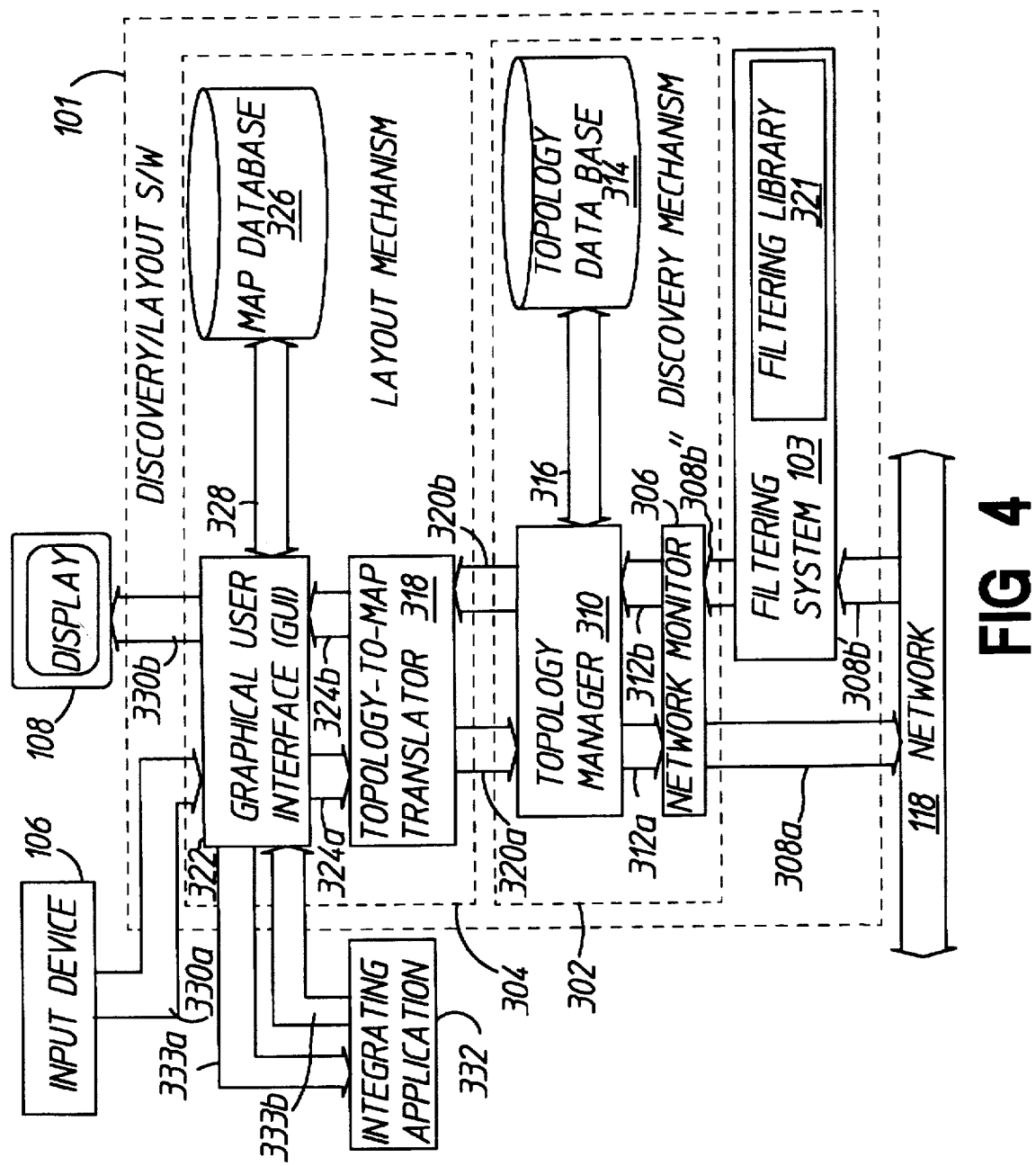
FIG. 4 is a second embodiment of the management station of FIG. 1 wherein the novel filtering system is situated between the discovery mechanism and the network.

A high level block diagram of a second embodiment of the discovery/layout software 101 (FIG. 1) is set forth in FIG. 4. As shown in FIG. 4, the second embodiment is constructed similar to the first embodiment (FIG. 3), and the previous discussion of similarly identified elements is incorporated herein by reference. In fact, both the discovery mechanism 302 and the layout mechanism 304 of the first and second embodiments of the discovery/layout software 101 are generally identical. However, the filtering system 103 in the second embodiment is situated between the discovery mechanism 302 and the network 118 so that the filtering system 103 filters objects that pass from the network 118 to the discovery mechanism 302. With this configuration, the filtering system 103 prevents nonallowable objects from even being stored in the topology data base 314.

C. Third Embodiment Of The Discovery/Layout Software

Figure 5:
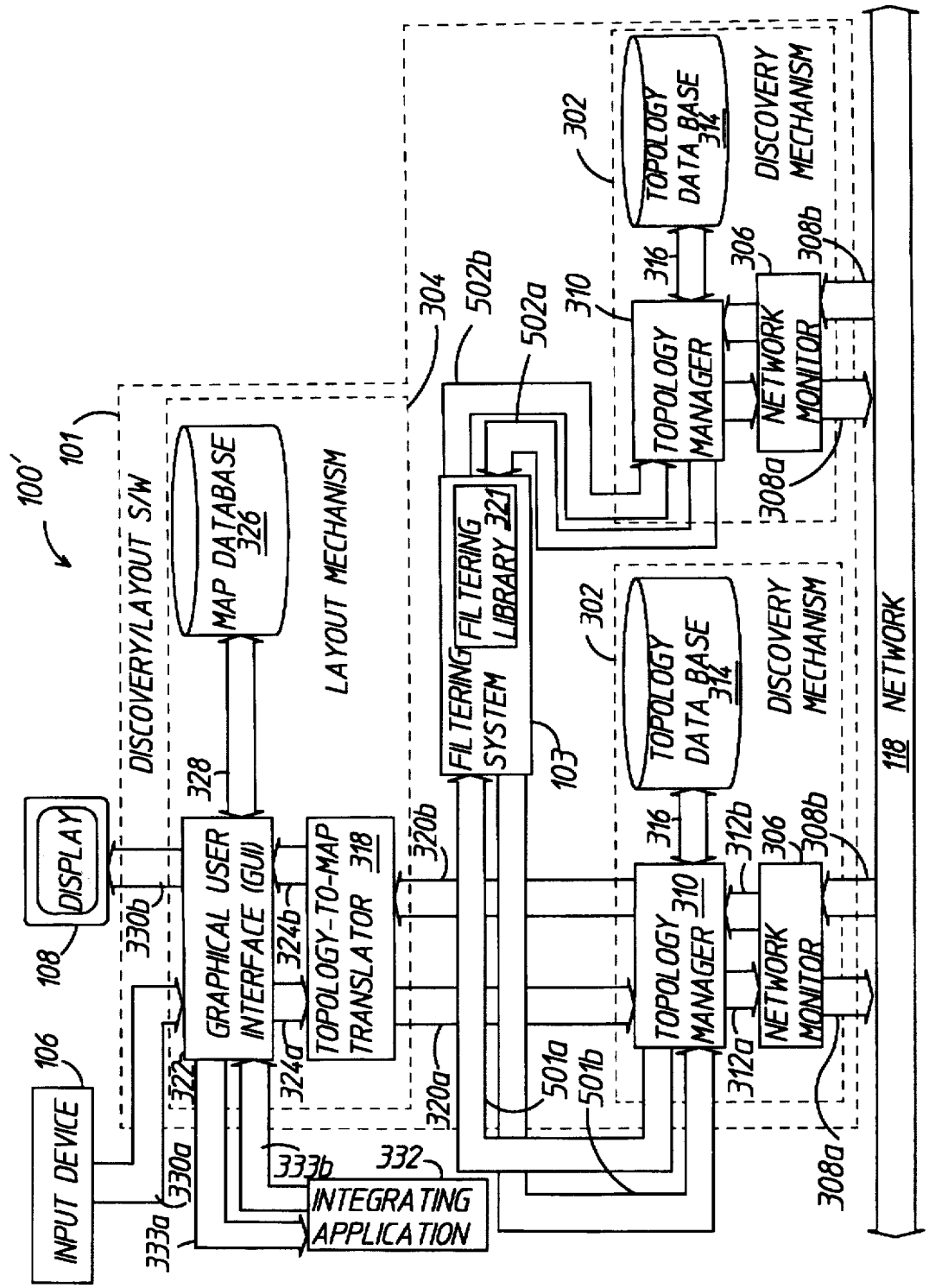
FIG. 5 is a third embodiment of the management station of FIG. 1 wherein the novel filtering system is situated between parallel discovery mechanisms.
Figure 6:
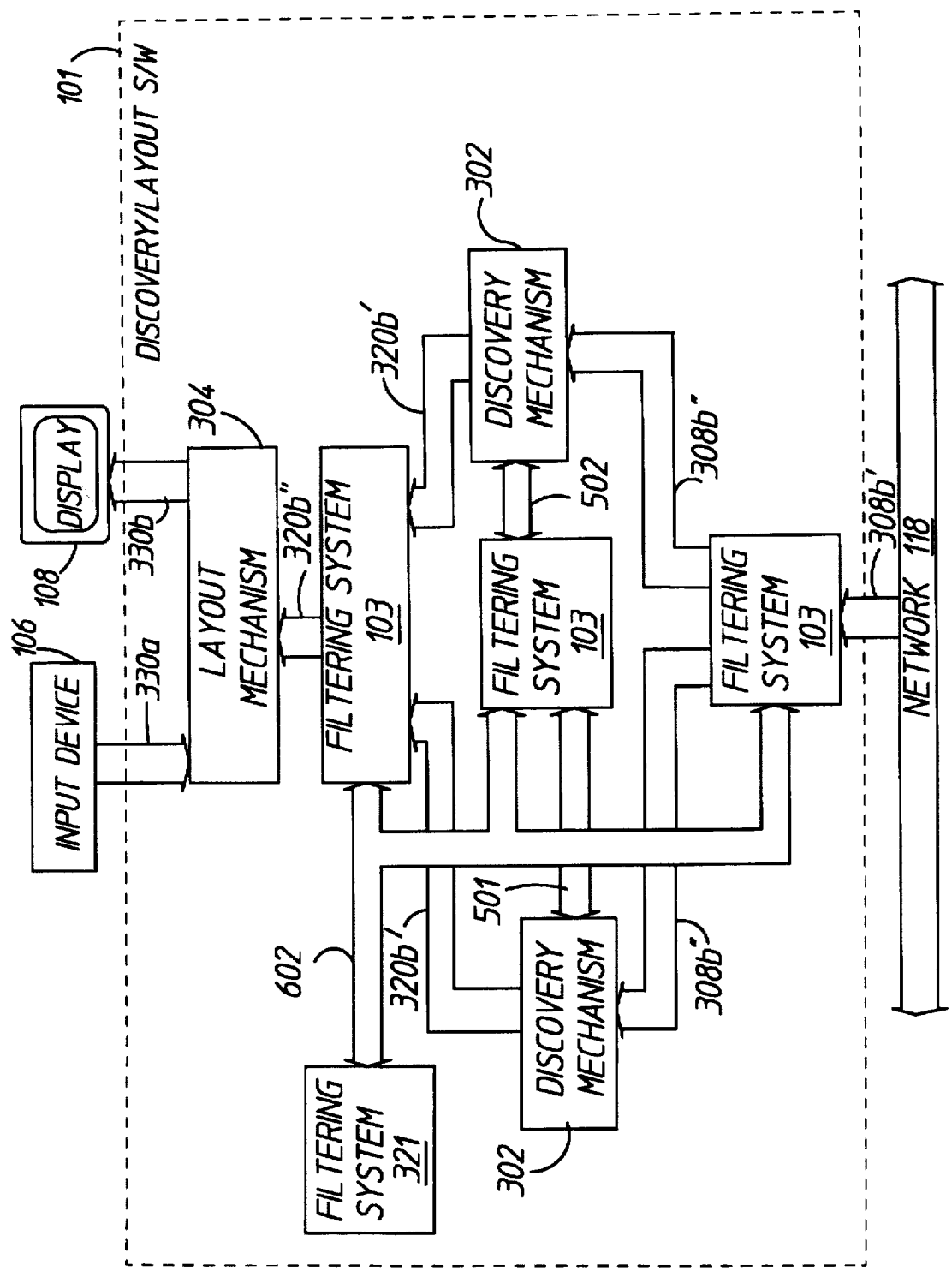
FIG. 6 is a fourth embodiment of the management station of FIG. 1 wherein a plurality of filtering systems utilize a common filtering library.

A high level block diagram of a third embodiment of the discovery/layout software 101 (FIG. 1) is shown in FIG. 5. The third embodiment of FIG. 5 is constructed similar to the first and second embodiments (FIGS. 3 and 4), and the previous discussion of similarly identified elements is incorporated herein by reference. In fact, the layout mechanism 304 of the third embodiment is identical to that of the first and second embodiments. However, a significant difference between the third embodiment and the first and second embodiments is the fact that the third embodiment utilizes a plurality of discovery mechanisms 302 (only two are shown in FIG. 6 for simplicity, but more are possible).

The discovery mechanisms 302 generally function in parallel to discover devices and interconnections on the network 118. In the preferred embodiment, the topology from each discovery mechanism 302 is merged to a single particular topology manager 310 where it is then communicated to the topology-to-map translator 318, as indicated by reference arrow 320b in FIG. 5. Moreover, requests for topology data are passed from the translator 318 to the particular topology manager 310, which then retrieves the information.

The discovery mechanisms 302 can transfer topology data between their respective topology managers 310 by way of a filtering system 103, as indicated by arrows 501a, 501b, 502a, 502b. The filtering system 103 as used in this context prevents transfer of nonallowable objects from one of the discovery mechanisms 302 to the other, while permitting transfer of allowable objects. Further, whether an object is allowable or nonallowable is defined by the filtering library 321, as previously discussed.

D. Fourth Embodiment Of The Discovery/Layout Software

A high level block diagram of a fourth embodiment of the discovery/layout software 101 (FIG. 1) is set forth in FIG. 6. As shown in FIG. 6, the fourth embodiment comprises a hybrid of the features associated with the first, second, and third embodiments. The fourth embodiment includes at least two discovery mechanisms 302 (only two are shown in FIG. 6 for simplicity, but more are possible). Moreover, the fourth embodiment includes a plurality of filtering systems 103, all utilizing a common filtering library 321, as indicated by reference arrow 602.

More specifically, a first filtering system 103 is situated between the discovery mechanisms 302 and the layout mechanism 304, as indicated by arrows 320b', 320b". For simplicity, only the filter data flow is illustrated in FIG. 6. The aforementioned placement of the filtering system 103 is similar to that which was described relative to the first embodiment.

A second filtering system 103 is situated between each of the discovery mechanisms 302 and the network 118, as indicated by arrows 308b', 308b" in order to filter objects within topology data received from the network 118. This filtering system configuration is similar to that which was described previously relative to the second embodiment of the discovery/layout software 101.

A third filtering system 103 is situated between the discovery mechanisms 302, as indicated by arrows 501, 502 in order to filter objects within topology data that is transferred from one discovery mechanism 302 to another discovery mechanism 302. This filtering system configuration is similar to that which was described in the third embodiment of the discovery/layout software 101.

Hence, as is apparent from FIG. 6, any combination of the filtering system placements described previously in the first, second, and third embodiments can be utilized and significantly, the filtering systems 103 can share the same filtering library 321. Because a common filtering library 321 is utilized, the individual components are freed from understanding the implementation and configuration of the filtering architecture. Moreover, the common filtering library 321 offers a consistent filtering system to the user. If each component were left to implement its own mechanism, each component would likely look different from each other to the user.

E. Filtering System

The filtering system 103 with library 321 employs the same methodology and architecture for the first through fourth embodiments of the discovery/layout software 101 (FIG. 1). Accordingly, for purposes of simplicity, the filtering system 103 will be described in connection with the first embodiment of the discovery/layout software 101, as is illustrated in FIG. 3.

Figure 7:
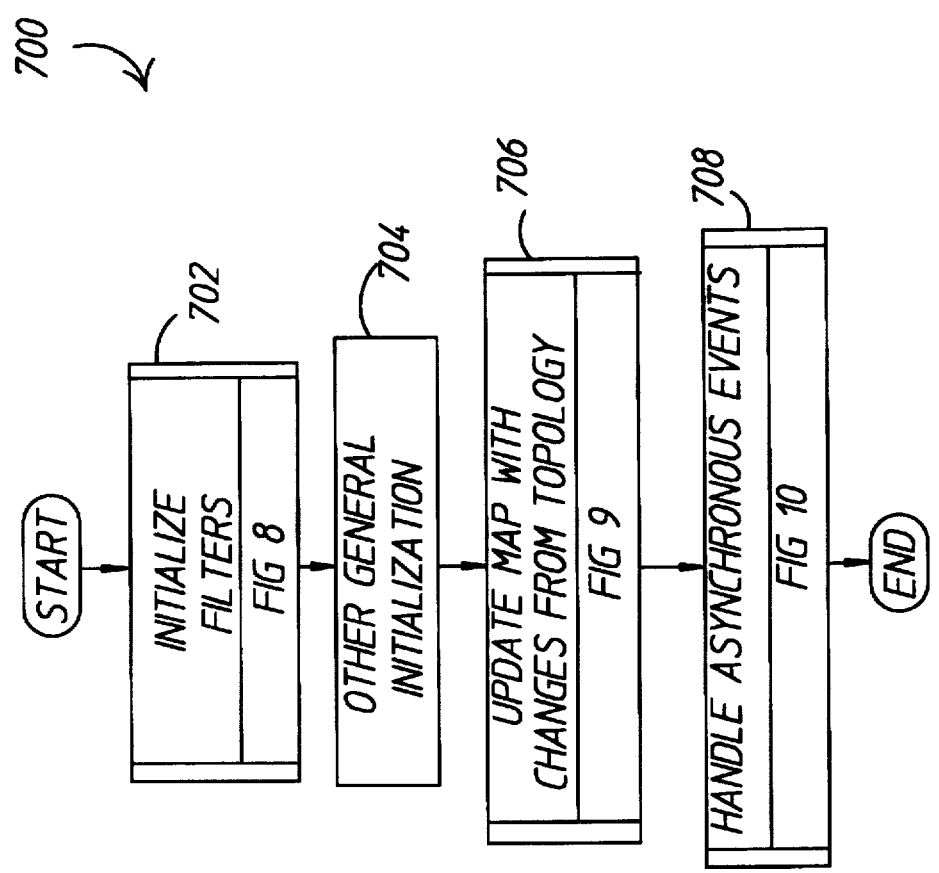
FIG. 7 is a flow chart illustrating the architecture and functionality of the topology-to-map translator of FIG. 3.

Preferably, although not required, the filtering system 103 is implemented as a part of the topology-to-map translator 318 (FIG. 3). FIG. 7 shows a flow chart 700 indicating the architecture and functionality of the preferred embodiment of the topology-to-map translator 318.

With reference to FIG. 7, first, the filtering system 103 is initialized, i.e., the filters within the library 321 are initialized, as will be further described with reference to FIG. 8. Next, other general initialization procedures are performed, as indicated in block 704. The general initialization procedures include establishing contact with the topology manager 310, establishing contact with the GUI 322, and reading map configuration data. Block 704 transfers to block 706. As indicated in block 706, the map is updated with the changes that have occurred in the topology data. This procedure is further delineated in FIG. 9 and will be described hereinafter in detail. Next, block 706 transfers to block 708. At block 708, asynchronous events are handled, which are further delineated in FIG. 10.

Figure 8:
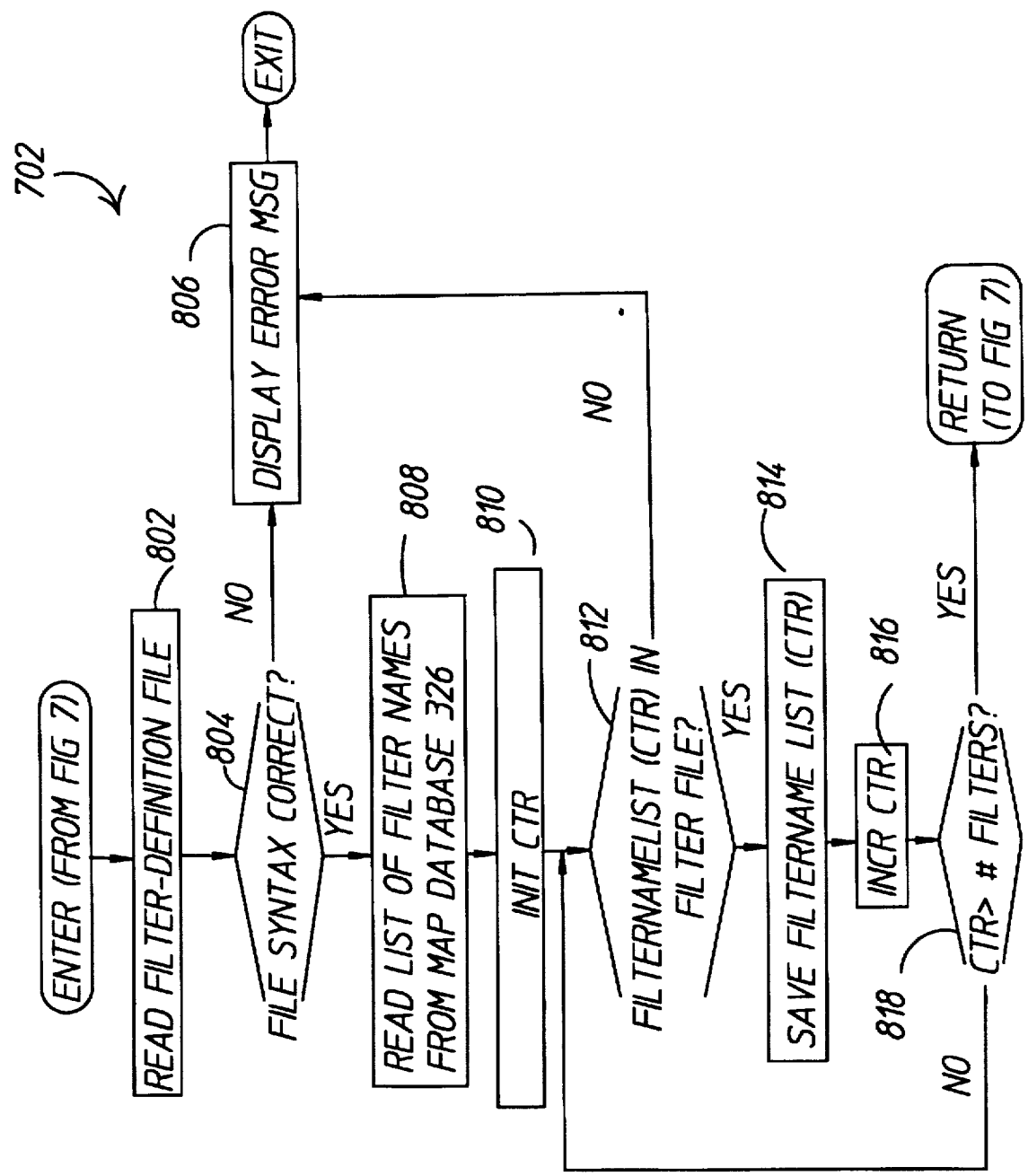
FIG. 8 is a flow chart illustrating the architecture and functionality of an initialize filters block of FIG. 7.

FIG. 8 shows a flow chart which illustrates the architecture and functionality of the initialize filters block 702 (FIG. 7). In this software module, the filters that the user has configured for the network management map 200 that is presently open are identified, and a determination is made as to whether the filters reside in the filtering library 321.

As indicated at block 802 of FIG. 8, the filter definition file grammar of Table A is read from the memory 110 (FIG. 1). Next, as indicated in the block 804, the syntax of the filter definition file grammar is checked for errors. The contents of this file should follow the grammar outlined in Table A. Any suitable parsing mechanism can be utilized for parsing the filter definition file grammar during the syntax checking procedure. In the preferred embodiment, the LEX and YACC tools of the "UNIX"™ operating system are utilized for parsing the fields of the filter definition file grammar. The LEX and YACC tools, the "UNIX"™ operating system, and the concept behind operation of these programs are all well known in the art and, further, these programs are commercially available. If the syntax is incorrect, then an error message is displayed over the display 108 (FIG. 1), as is indicated in the block 806 and the operation of the translator 318 is terminated. When the syntax of the filter definition file grammar is correct, the block 804 transfers to the block 808.

As delineated at the block 808, the list of filter names is read from the map data base 326. Block 808 transfers to a loop, which determines which filter names should be associated with the map at issue. The loop commences with block 810, where a counter CTR for filter names is initialized.

After the counter CTR has been initialized, a filter name is selected from the list and processed by the loop. As indicated at flow chart block 812, it is determined whether the filter name from the list, denoted FILTERNAMELIST [CTR] where CTR=number, is in the filter definition file grammar. If the filter name FILTERNAMELIST[CTR] is not in the filter definition file grammar, then an error message is displayed over the display 108, as indicated in the block 806 and the translator 318 terminates operation. If the filter name FILTERNAMELIST[CTR] is in the filter definition file grammar, then the filter name FILTERNAMELIST[CTR] is saved for future processing, as indicated in block 814. Block 814 transfers to block 816, where the counter CTR is incremented. Next, at block 818, a determination is made as to whether the counter CTR is greater than the total number of filter names. If not, then the block 818 transfers back to block 812 and the loop continues. If so, then the block 818 transfers to block 704 (FIG. 7).

Thus, after the procedure set forth in FIG. 8, the filters that the user has configured for the network management map 200 that is presently open have been identified, and a determination has been made as to whether the filters reside in the filtering library 321.

Figure 9:
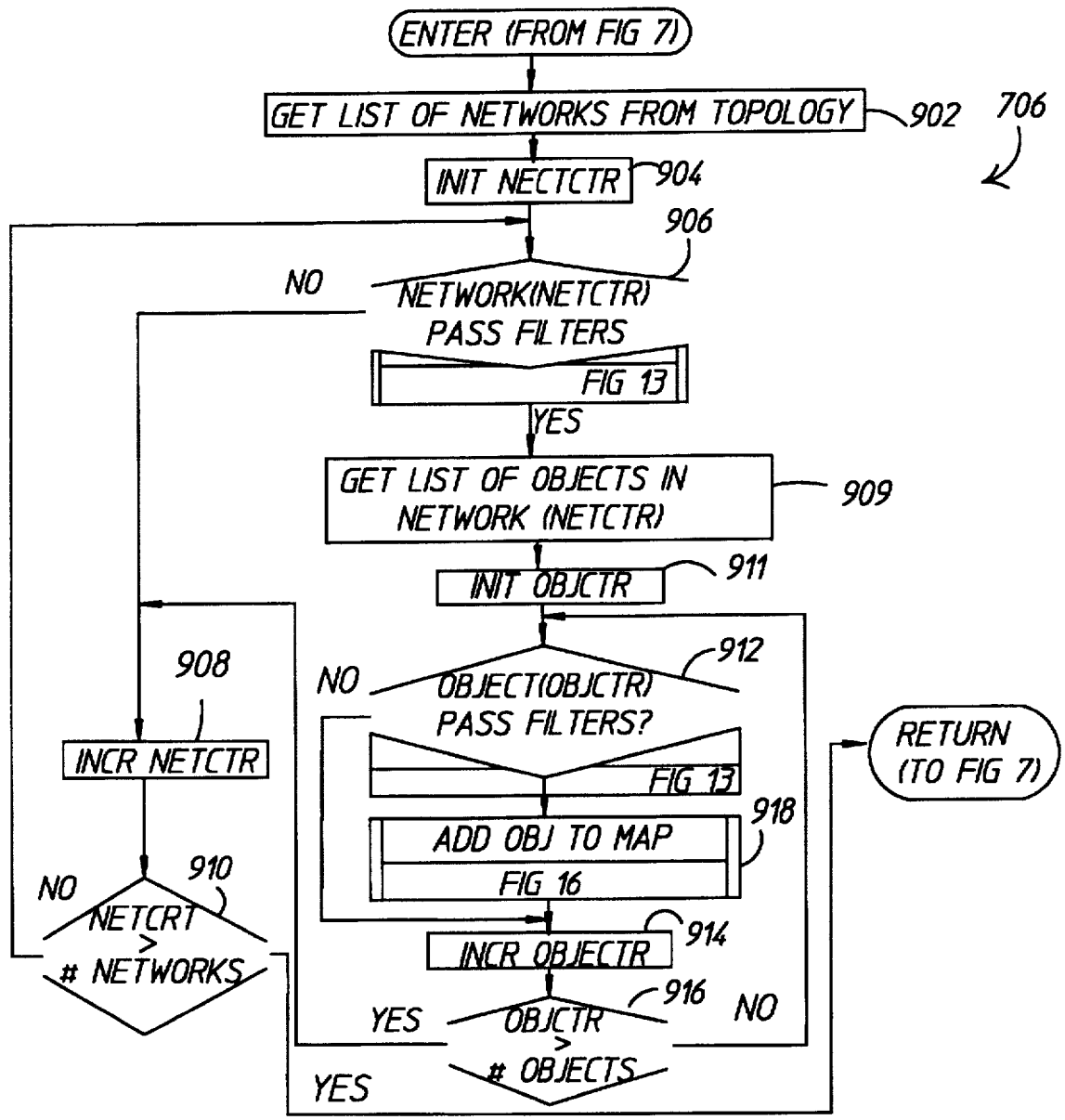
FIG. 9 is a flow chart illustrating the architecture and functionality of an update map block of FIG. 7.

FIG. 9 illustrates a flow chart that describes the architecture and functionality of the update map block 706 (FIG. 7), wherein the map data residing within the map data base 326 is updated based upon the filtered topology data. As indicated at block 902, a list of the one or more networks is retrieved by the translator 318 from the topology manager 310, which in turn obtains the list from the topology data base 314. Block 902 transfers to a loop that commences with block 904 and that processes and filters the objects in each network.

At block 904, a counter NETCTR is initialized. Next, at block 906, a determination is made as to whether the particular network NETWORK[NETCTR], where NETCTR=number, passes the filters (prescribed by the filter names) pertaining to the map 200 that is open. This procedure will be further described later with reference to FIG. 13. If it is determined that the current network NETWORK [NETCTR] does not pass through the filters, then the counter NETCTR is incremented, as indicated in the block 908. Further, a determination is made as to whether the counter NETCTR has surpassed the total number of networks in the open map 200, as indicated in the block 910. If it is determined that the counter NETCTR has not exceeded the total number of networks, then the block 910 transfers back to the block 906 and the loop continues. To the contrary, if the counter NETCTR has exceeded the total number of networks, then the block 910 transfers back to the block 708 (FIG. 7).

If it is determined that the current network NETWORK [NETCTR] is allowable based upon the filters in block 906, then block 906 transfers to block 909. At block 909, the translator 318 obtains a list of objects within NETWORK [NETCTR] from the topology manager 310 (and ultimately from the topology data base 314). The block 909 transfers to a loop, which processes each object in the list to determine which objects pass the filters. In this regard, block 909 transfers to block 911, where a counter OBJCTR is initialized.

Next, a determination is made as to whether the current object, OBJ[OBJCTR] where OBJCTR=number, passes the filters, as indicated in the block 912. This determination will be further described with reference to FIG. 13 hereinafter. If it is determined that the current object OBJ[OBJCTR] does not pass the filters, then the counter OBJCTR is incremented, as indicated in the flow chart block 914. Moreover, a determination is made as to whether the counter OBJCTR has exceeded the total number of objects. If not, then the block 916 transfers back to block 912 and the loop continues and processes the next object. If so, then the block 916 transfers to the block 908 (which causes selection of another network, if any are available).

If it is determined at block 912 that the current object OBJ[OBJCTR] passes the filters within the library 321, then the block 912 transfers to the block 918. At the block 918, the translator 318 adds the current object to the map 200. This procedure is further delineated in FIG. 16, which will be described later in this document. After the object has been added to the map, the counter OBJCTR is incremented, and another object is processed, if available, as indicated in flow chart blocks 914, 916.

Figure 10:
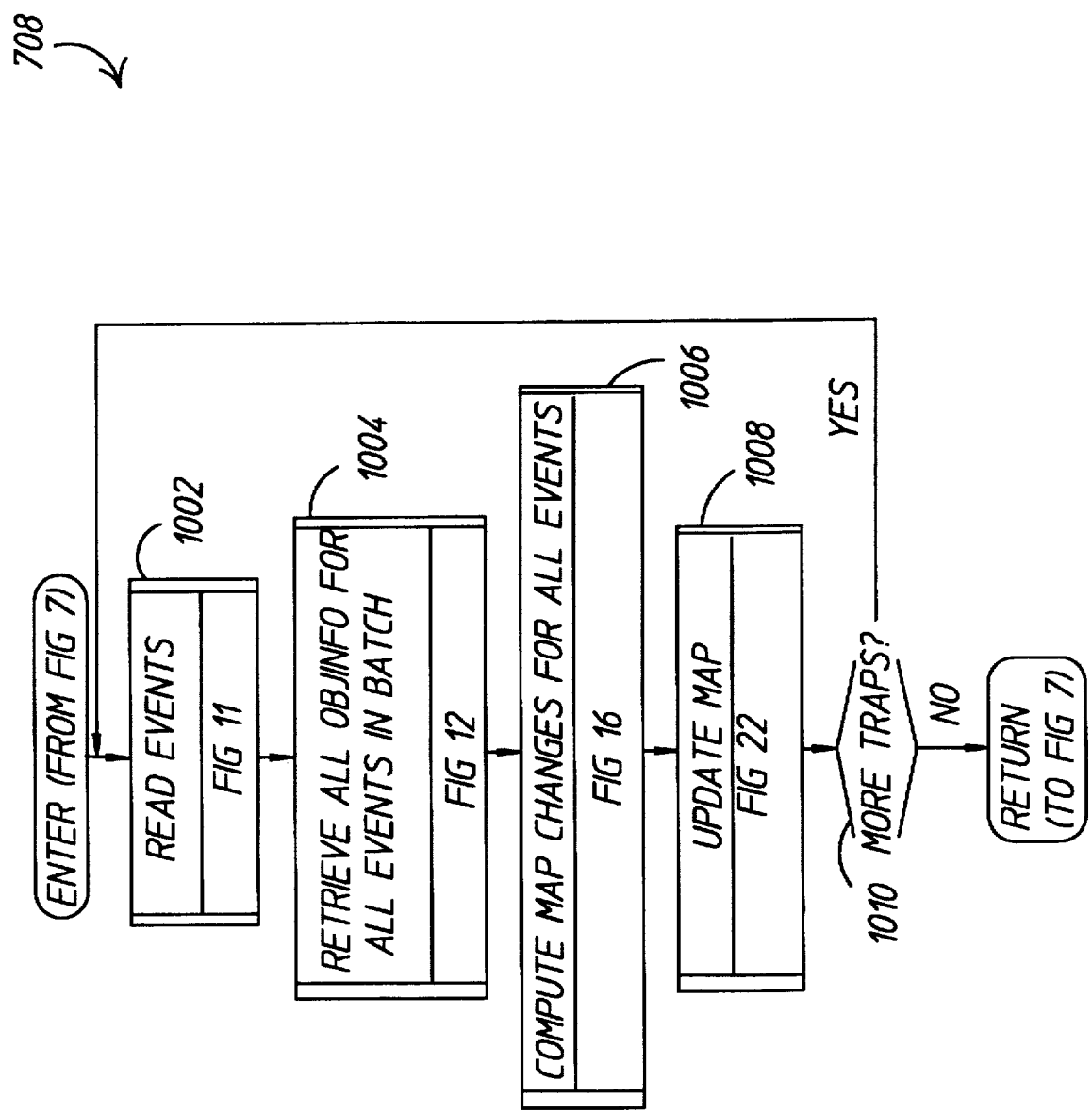
FIG. 10 is a flow chart illustrating the architecture and functionality of an asynchronous events block of FIG. 7.

FIG. 10 shows a flow chart pertaining to the handling of asynchronous events, as indicated in the block 708 of FIG. 7. When network topology changes on the network, the network monitor 306 generates events, or traps (SNMP vernacular), which include an object identifier and object change information. The network monitor 306 can also receive events from other devices, such as a router, in the network 118.

With reference to FIG. 10, initially, events are queued and accumulated in a queue (not shown) or accumulator, associated with a topology manager 310, and await retrieval by the translator 318. The translator 318 reads a batch of events from the topology manager 310 during each access.

Next, as indicated in block 1004, the translator 318 calls the topology manager 310 for a list of topology data regarding all objects which were identified in the events. After receiving the topology data, block 1004 transfers to block 1006.

At block 1006, the translator 318 computes the changes to be made to the map data, particularly the network management map 200 (FIG. 2), based upon the topology data changes indicated in the events. Block 1006 transfers to block 1008. At block 1008, the translator 318 updates the map 200 (FIG. 2) by calling the GUI 322 and advising the GUI 322 of all submap changes (SYMCHANGELIST and NEWSYMLIST described hereinafter) pertaining to all object changes. This transaction is preferably, although not necessarily, a batch transfer. During this batch transfer transaction, the translator 318 identifies each submap to be changed, each object to be changed within a submap, and the particular change to be effectuated to the object. An object change may include, for example, but not limited to, a color, position, or connection change. Block 1008 transfers to block 1010.

At block 1010, the translator 318 determines whether there is another batch of events to be read from the topology manager 310. If so, then block 1010 transfers to block 1002 and the previously described process is repeated. If not, then the software waits at block 1010 for another batch of events.

Figure 11:
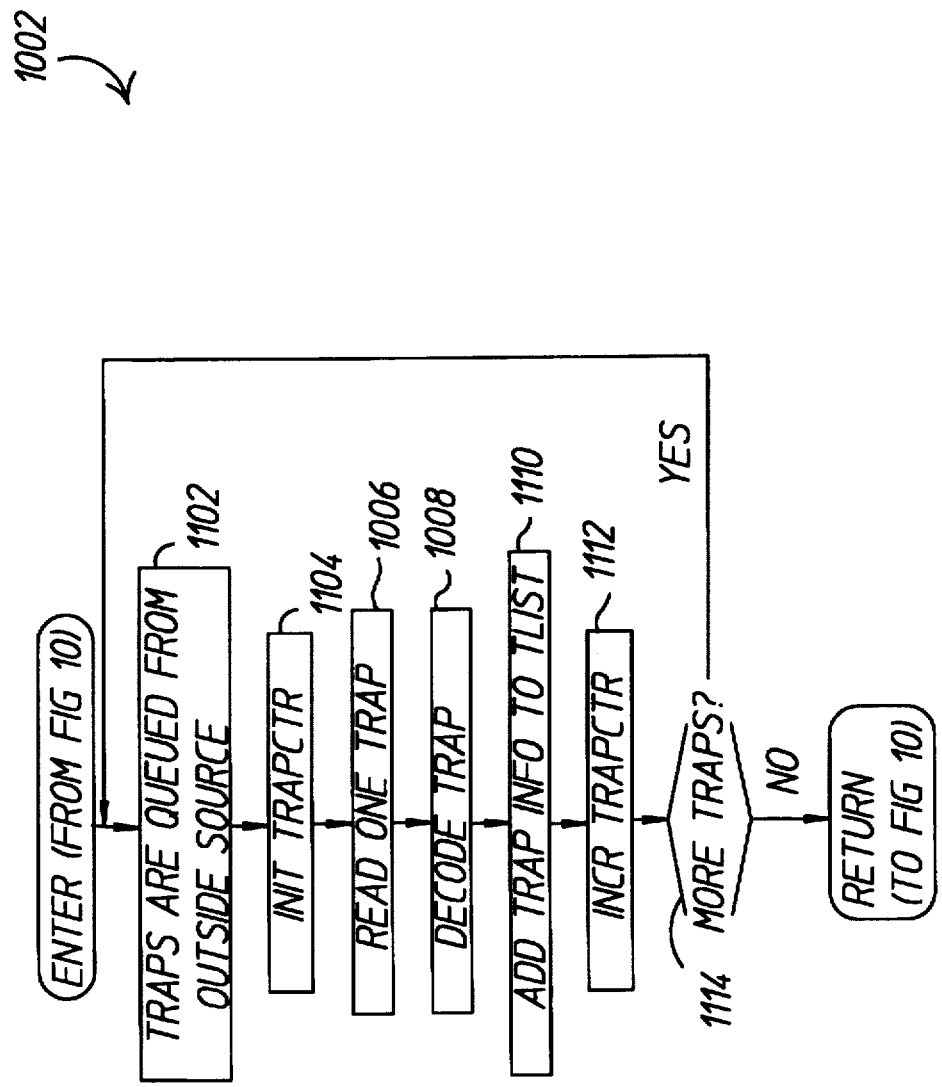
FIG. 11 is a flow chart illustrating the architecture and functionality of a read events block of FIG. 10.

FIG. 11 sets forth a flow chart indicating the architecture and functionality of the read events block 1002 (FIG. 10). This flow chart illustrates how the translator 318 reads a batch of events from the topology manager 310. As indicated in a block 1102, initially, events from the topology manager 310 are accumulated (queued). A counter TRAPCTR at block 1104 is used in connection with a loop in order to route each event from the topology manager 310 to the translator 318. At block 1106, an event is read by the translator 318 from the topology manager 310. Block 1106 transfers to block 1108, which decodes the event. The event is decoded to identify the type of event and associated data. There are numerous types of events, and different types of events will have different types of associated data. More specifically, an event can involve, for example, but not limited to, a new node or a node status change (e.g., connected/accessible or connected/unaccessible). An event has an event identifier, usually at the header, for identifying the type of event. Moreover, in the case of a new node, the event will contain an object identifier and an address. In the case of a node status change, the event will contain an object identifier, the old status, and the new status.

Block 1108 transfers to block 1110. At block 1110, the decoded event data (i.e., a record) is added to a TLIST. At block 1112, the counter TRAPCTR is incremented so that another event is serviced. Block 1112 transfers to block 1114, which determines whether there are any more events to be serviced. If so, then block 1114 transfers back to block 1106 and the aforementioned process is repeated. If not, then block 1114 returns to block 1002 (FIG. 10).

Figure 12:
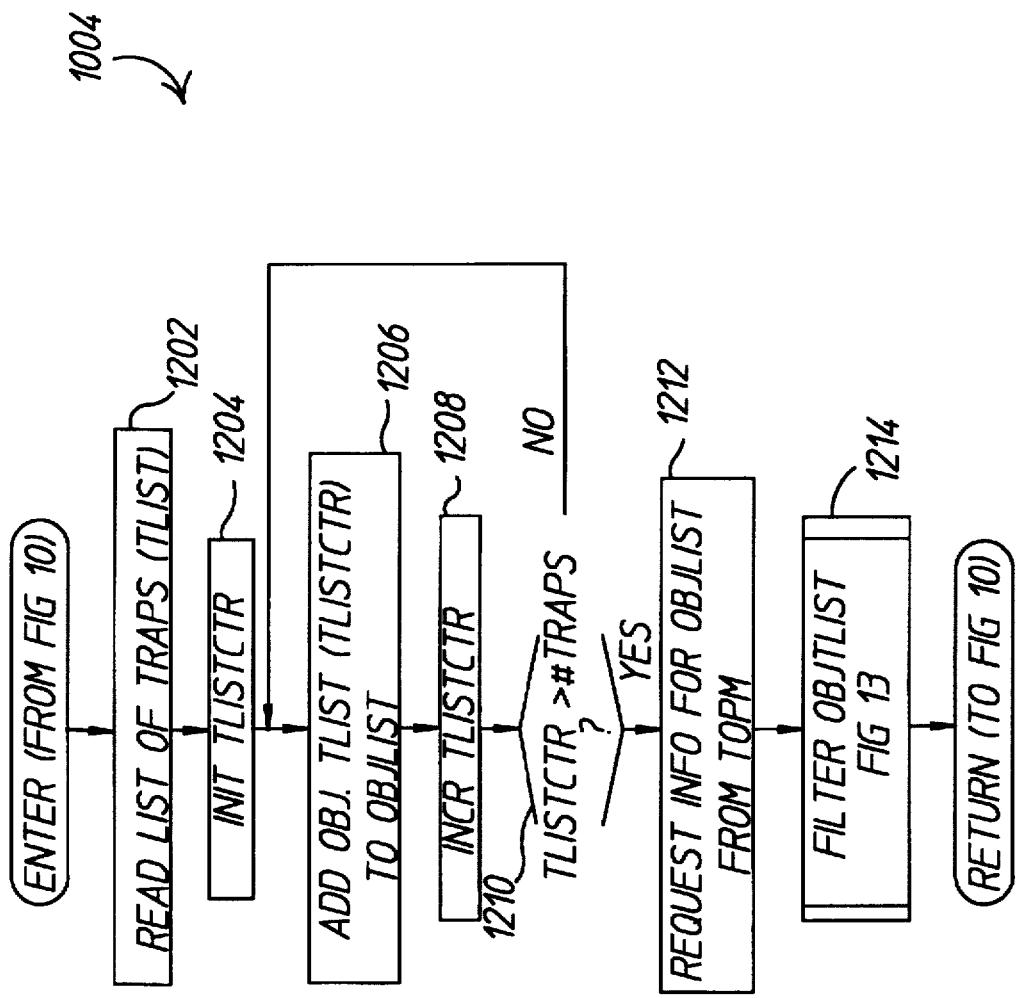
FIG. 12 is a flow chart illustrating the architecture and functionality of a retrieve object information block of FIG. 10.

FIG. 12 shows a flow chart of the architecture and functionality of a preferred embodiment for implementing the retrieve object information block 1004 (FIG. 10). With reference to FIG. 12, at blocks 1202, the list of events, TLIST, is read. Block 1202 transfers to block 1204, which commences a loop that causes all of the events within the TLIST to be serviced.

At block 1204, a counter TLISTCTR is initialized. Block 1204 transfers to block 1206. At block 1206, a single record is read from TLIST. From the record, an object identifier and an object change are determined. The foregoing data is placed in an object list, OBJLIST. Next, as indicated in block 1208, the counter TLISTCTR is incremented so that another record of TLIST is serviced, if any remain. Block 1208 transfers to block 1210. At block 1210, it is determined whether there are any events left to be serviced by comparing the record count of the record counter CTR to the total number of records already processed. If so, then block 1210 transfers back to block 1206, which begins to service another record. If not, then the block 1210 transfers to block 1212, which sends a request to the topology manager 310 for a batch transfer of object information pertaining to all of the objects within the batch. The object information for each object includes an object name, address, status, connectivity information, etc.

Next, as indicated in block 1214, the object list OBJLIST is filtered to remove objects that do not pass the filters within the library 321. This process is further delineated in FIG. 13, as is immediately described hereafter.

Figure 13:
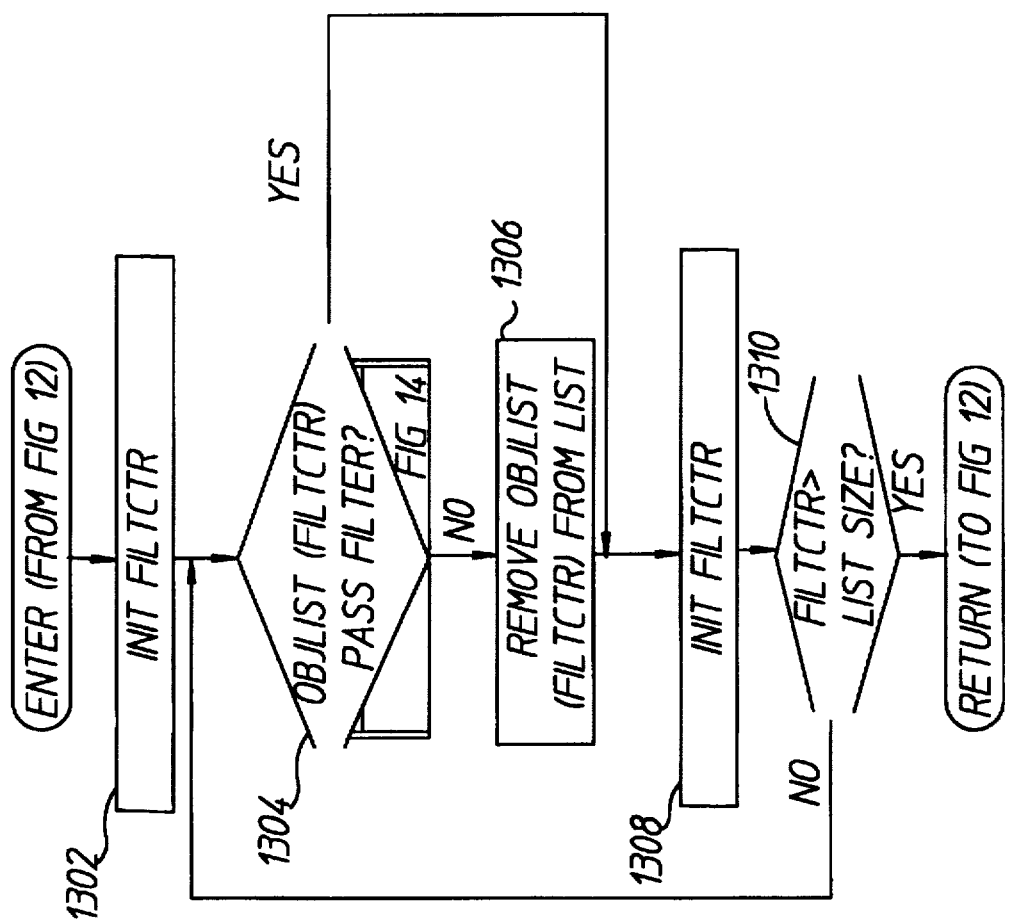
FIG. 13 is a flow chart illustrating the architecture and functionality of a filter object list block of FIG. 12.

As indicated in FIG. 13, the object list OBJLIST is processed by first initializing an object counter FILTCTR, as is indicated in the block 1302. Block 1302 transfers to block 1304, where it is determined whether the particular object OBJLIST[FILTCTR] passes the filters. If it is determined that the particular object OBJLIST[FILTCTR] does comply with the filter specification, then the particular object is permitted to remain in the object list OBJLIST. If it is determined that the particular object does not pass the filters, then the particular object OBJLIST[FILTCTR] is removed from the object list OBJLIST, as is indicated in the block 1306.

Next, the object counter is incremented, as delineated in flow chart block 1308, and a determination is made as to whether the object counter has exceeded the total number of objects, as is indicated in the flow chart block 1310. If all of the objects have not been serviced as indicated by the object counter, then the block 1310 transfers back to the block 1304 and another object is serviced. Otherwise, when the object counter CTR has exceeded the total number of objects, then the block 1310 transfers back to block 1004 (FIG. 12).

Figure 14:
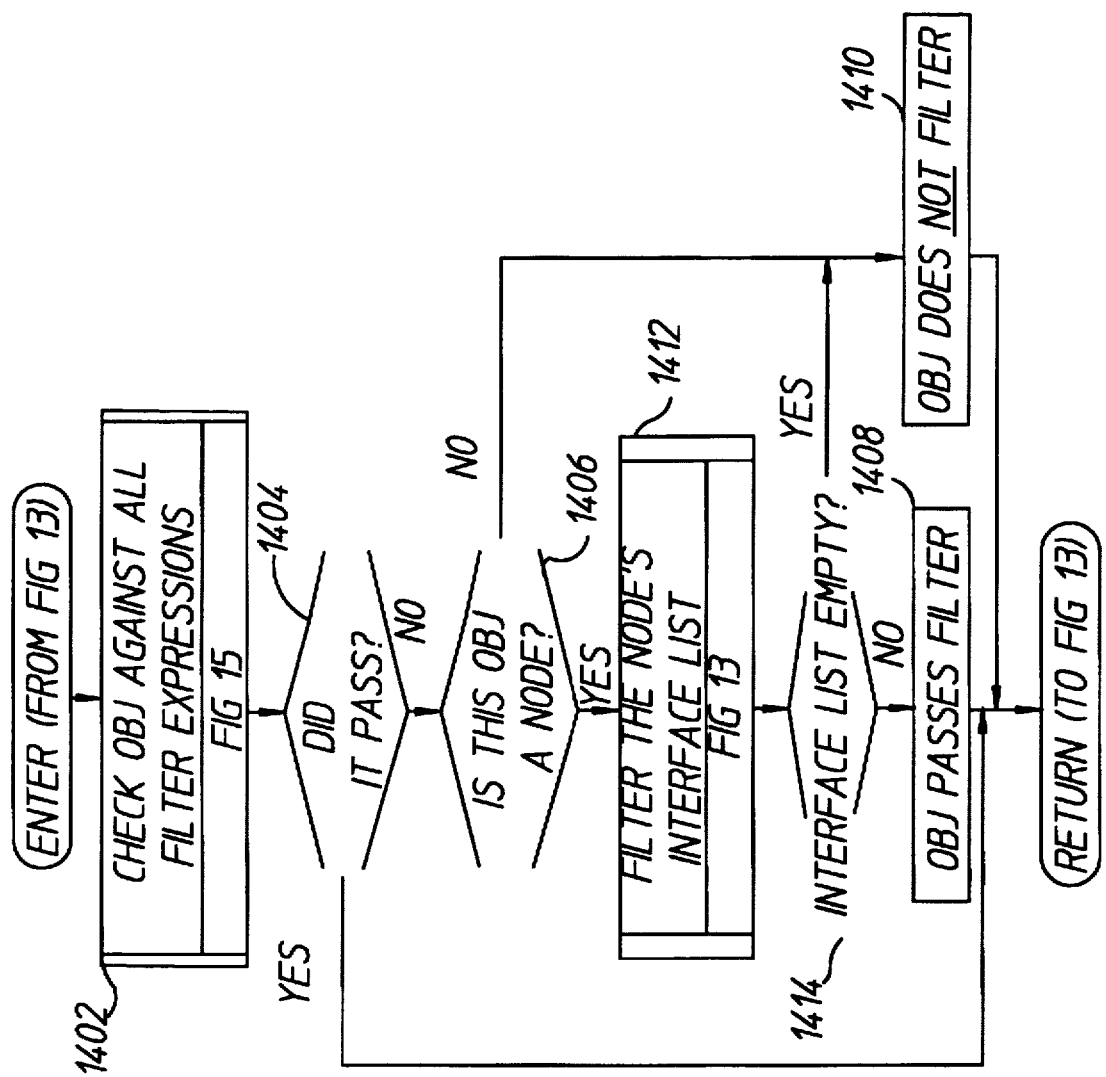
FIG. 14 is a flow chart illustrating the architecture and functionality of a check object (against filter) block of FIG. 13.

FIG. 14 is a flow chart illustrating the methodology for determining whether an object passes the filter specification, as was indicated in block 1304 (FIG. 13). The methodology of FIG. 14 implements special processing to handle nodes, which contain interfaces. A node might not pass the filter specification, but an interface within a nonallowable node may pass the filter specification. Thus, the methodology is designed so that a node will pass the filter specification if its fields pass the filter specification or if any interfaces within the node pass the filter specification.

Initially, as indicated in block 1402, the particular object OBJLIST[CTR] is checked against all filter expressions to determine if the object should be removed from the object list OBJLIST or left to remain in the list OBJLIST. This procedure is more fully delineated in FIG. and will be described hereafter.

Block 1402 transfers to block 1404. At block 1404, a determination is made as to whether the particular object OBJLIST[CTR] has passed the filter specification. If so, then the block 1404 transfers to the block 1408, which tags the particular object as having passed (i.e., is allowable), and the process transfers back to block 1306 (FIG. 13). If not, then the block 1404 transfers to the block 1406 which makes an inquiry as to whether the particular object is a node.

If the object is not a node, then the object is deleted as it does not pass the filter specification, as is delineated in the flow chart block 1410. To the contrary, if the object is a node as determined at the block 1406, then the block 1406 transfers to the block 1412, which filters the list of interfaces within the node. This procedure has been described relative to FIG. 13 hereinbefore.

Block 1412 transfers to the block 1414, which makes a determination as to whether the interface list is empty. If empty, then all of the interfaces were deemed to be nonallowable. If it is empty, then the block 1414 transfers to the block 1410 and the object is removed from the object list OBJLIST. If it is determined at block 1414 that the interface list is not empty, then the block 1414 transfers to the block 1408 and the object will ultimately be added to the object list OBJLIST as it passes the filter specification.

Figure 15:
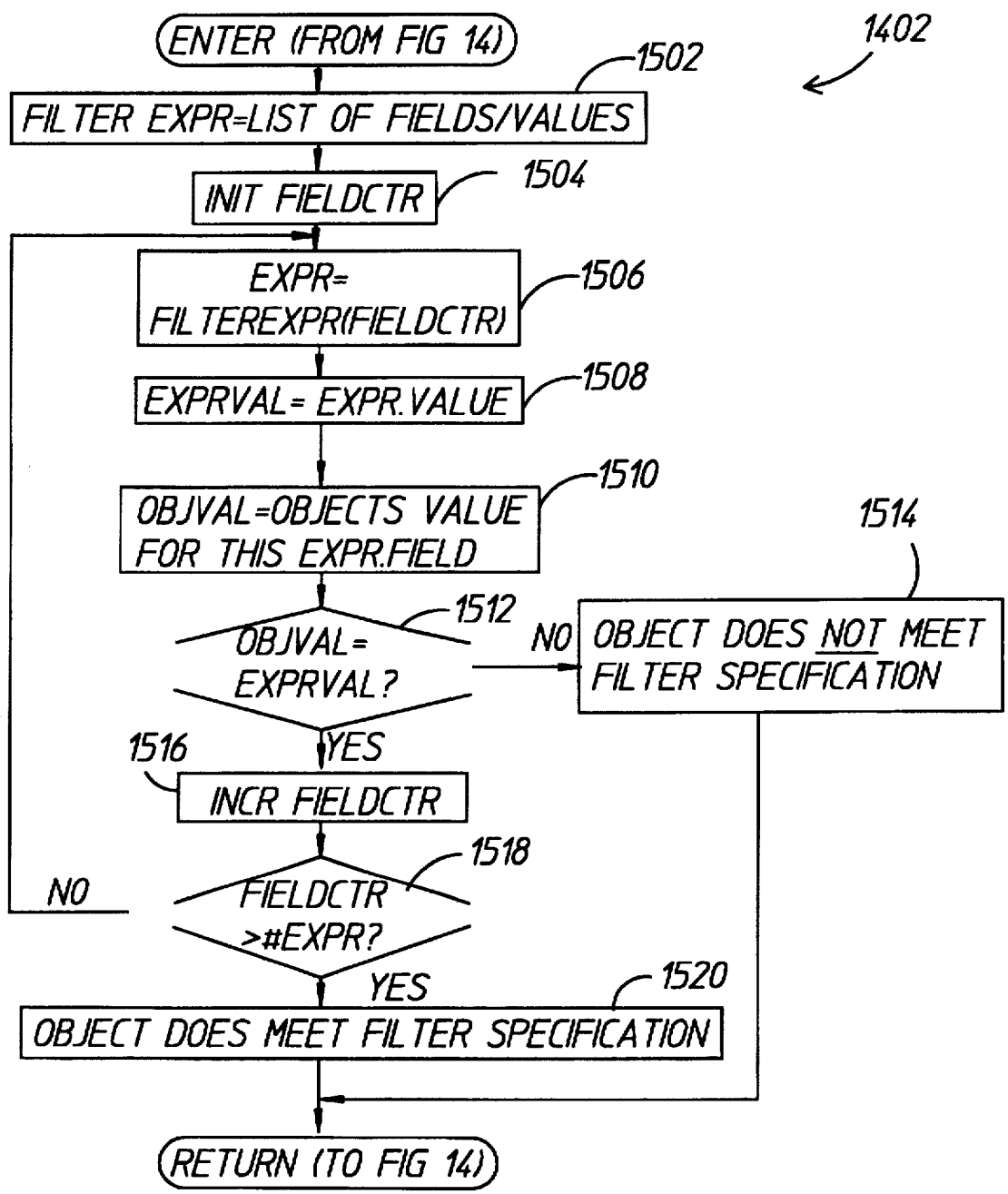
FIG. 15 is a flow chart illustrating the architecture and functionality of a check object (against all filter expressions) block of FIG. 14.

FIG. 15 shows a flow chart for determining whether an object should be classified as either allowable or nonallowable pursuant to the filter specification defined by the sets, filters, and filter expressions in the filter definition files used by the filtering library 321. The functionality set forth in the flow chart of FIG. 15 is embodied in block 1402 (FIG. 14). FIG. 15 implements a portion of the grammar set forth in Table A. It demonstrates how filters can be implemented for a simple grammar. The complete grammar is an extension of this concept and is implemented using LEX and YACC tools in the preferred embodiment.

Referring to FIG. 15, a block 1502 sets a variable FILTEREXPR to assume a list of fields and values. Each field is a filter name and its corresponding value can be true, false, an integer, or a character string.

Block 1502 transfers to block 1504, which initiates an object counter FIELDCTR for the purpose of considering all of the pairings of fields and values with respect to the object at issue. Block 1504 transfers into the loop which begins with block 1506.

At block 1506, a variable EXPR is set to assume a field and a value. Block 1506 transfers to block 1508, which sets a variable EXPRVAL to assume the value portion within the variable EXPR. Block 1508 transfers to block 1510.

At block 1510, a variable OBJVAL is set to assume the value of the field EXPR.FIELD pertaining to the object at issue. This field value is retrieved from the topology data base 314. Block 1510 transfers to block 1512.

At block 1512, OBJVAL is compared to EXPRVAL, i.e., the object value is compared to the value specified in the filter specification. If the object value does not match the filter specification value, then the object does not meet the filter specification, as indicated at block 1514 and the flow chart terminates. However, if the object value matches all of the filter specification values, then the object is ultimately permitted to reside in the object list OBJLIST, as is indicated in the flow chart block 1520. Before reaching block 1520, block 1512 transfers to block 1516, which increments the field counter FIELDCTR initiated in block 1504. Moreover, block 1516 transfers to block 1518, which determines whether all EXPRs have been considered. If some remain, then block 1518 transfers back to block 1506 and the foregoing process continues. If no more EXPRs remain, then the flow chart transfers to block 1520, which specifies the object is meeting the filter specification and then the flow chart terminates.

Figure 16:
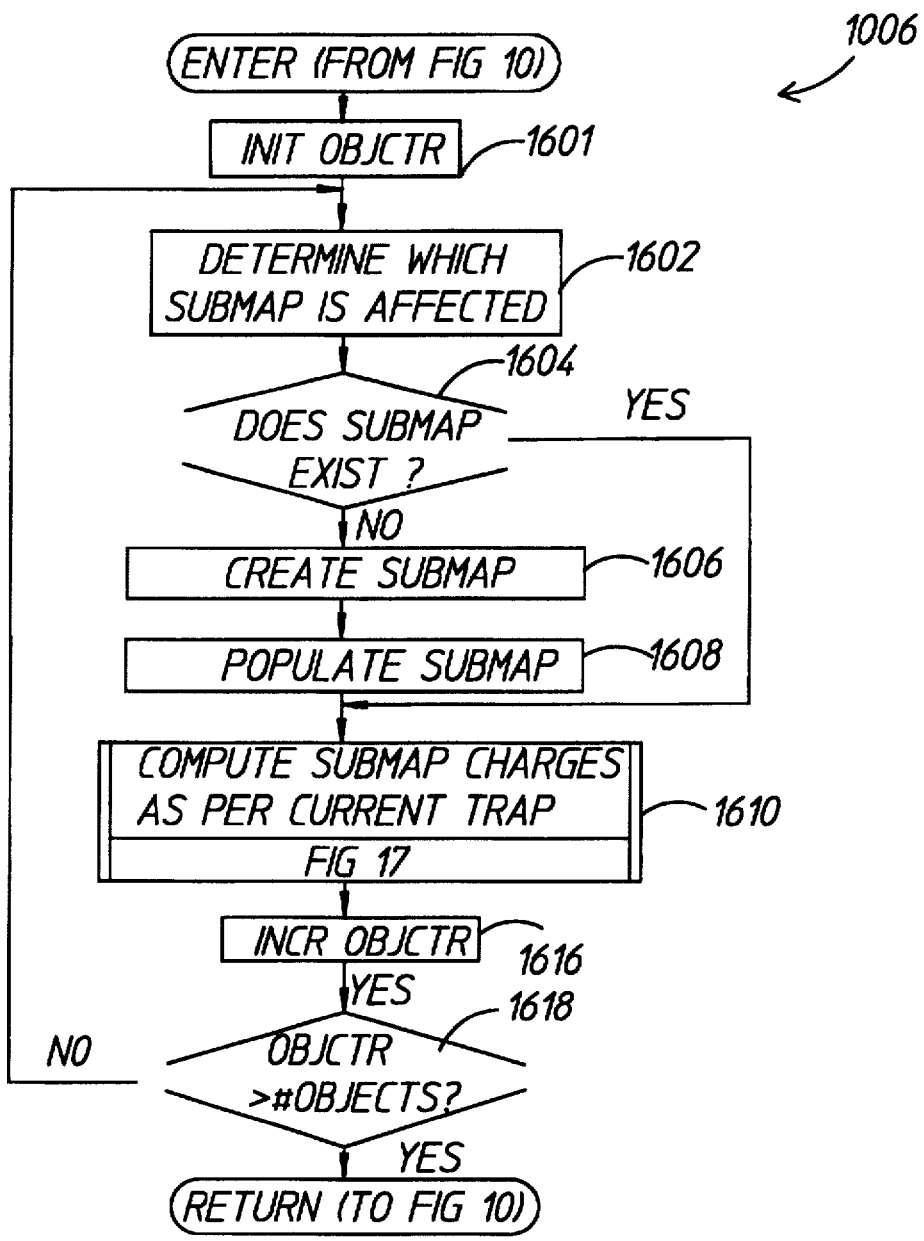
FIG. 16 is a flow chart illustrating the architecture and functionality of a compute map changes block of FIG. 10.

FIG. 16 shows a flow chart of the architecture and functionality of a preferred embodiment of the compute map changes block 1006 (FIG. 10). In this flow chart, the translator 318 determines which submaps (FIG. 2) are changed and the change to be effectuated, based upon the object identifiers and the object changes, which were previously determined based upon the events. With reference to FIG. 16, block 1601 initiates an object change counter OBJCTR so that all object changes are considered. Block 1601 transfers to block 1602. Block 1602 determines a submap identifier based upon which of the submaps (FIG. 2) are affected by the object change which is presently at issue. Block 1602 transfers to block 1604, which determines whether the affected submap exists. If the submap does exist, then the block 1604 transfers to block 1610. If the submap does not exist, then the block 1604 transfers to block 1606. Block 1606 creates the affected submap in the map 200 (FIG. 2). Block 1606 transfers to the block 1608.

At block 1608, the translator 318 populates the newly created submap with data from the topology manager 310. Next, at block 1610, submap changes based upon the current event, particularly the object identifier and the object change, are computed. The computations of block 1610 will be described hereinafter relative to FIG. 17. Block 1610 transfers to block 1616.

At block 1616, the object change counter OBJCTR is incremented so that another object change is considered with respect to the submaps. Block 1616 transfers to block 1618, which makes a determination as to whether any object changes remain to be serviced. If so, then the block 1618 transfers back to the block 1602. If not, then the flow chart terminates after block 1618.

Hence, at the conclusion of the operation of the steps in FIG. 16, a batch of submap identifiers with associated submap changes has been generated from the batch of object identifiers with associated object changes.

Figure 17:
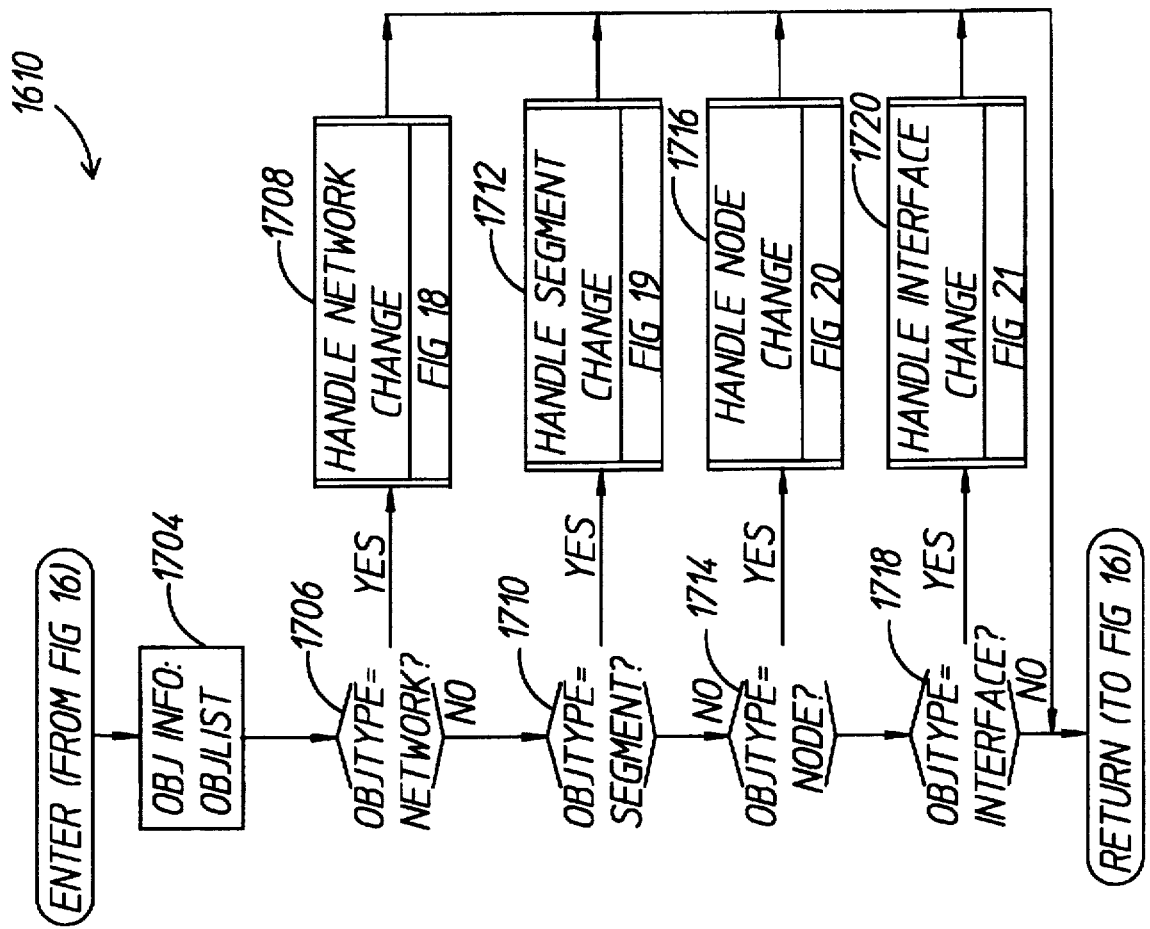
FIG. 17 is a flow chart illustrating the architecture and functionality of a compute submap changes block of FIG. 16.

With reference to FIG. 17, relative to the submap change computations of block 1610 (FIG. 16), block 1704 retrieves data concerning a single object from the object list OBJLIST. Block 1704 transfers to block 1706, which determines whether the object type is a network. If so, then block 1706 transfers to block 1708 (flow chart in FIG. 18), which computes the submap changes, and then block 1708 transfers to block 1722. If not, then the block 1706 transfers to the block 1710.

At block 1710, a determination is made as to whether the object type is a segment. If so, then the block 1710 transfers to the block 1712 (flow chart of FIG. 19), which computes the segment changes to the submaps, and then block 1712 transfers to block 1722. If not, then the block 1710 transfers to the block 1714.

At block 1714, a determination is made as to whether the object type is a node. If so, then the block 1714 transfers to the block 1716 (flow chart of FIG. 20), which computes the node changes for the submaps, and then block 1716 transfers to block 1722. If not, then the block 1714 transfers to the block 1718.

At block 1718, a determination is made as to whether the object type is an interface. If so, then the block 1718 transfers to the block 1720 (flow chart of FIG. 21), which computes the interface changes to the submap, and then block 1720 transfers to block 1722. If not, then the flow chart terminates.

Figure 18:
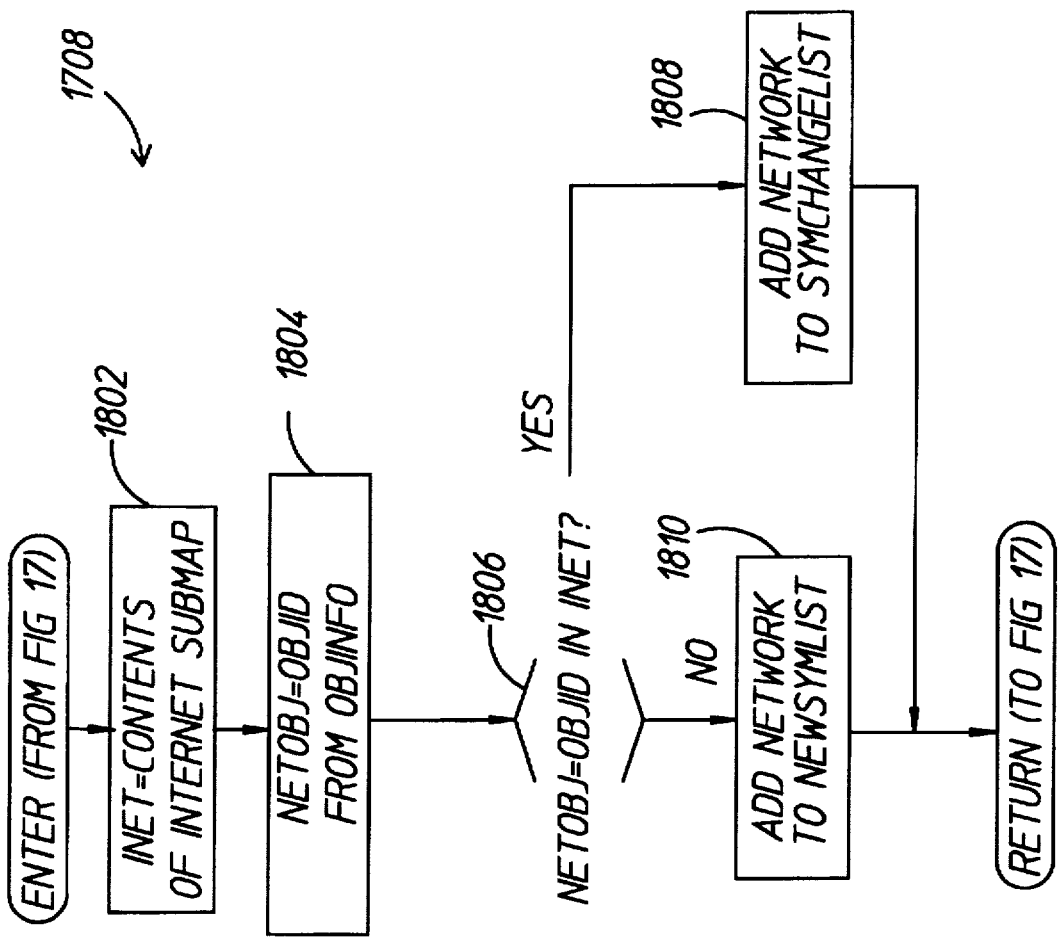
FIG. 18 is a flow chart illustrating the architecture and functionality of a handle network change block of FIG. 17.

FIG. 18 shows a flow chart of the architecture and functionality of a preferred embodiment for implementing the network change block 1708 (FIG. 17). This flow chart computes changes to the internet submap 204 (FIG. 2), which displays the networks. Moreover, there is only a single submap (multiple submaps are possible) at the internet level in the preferred embodiment. With reference to FIG. 18, at block 1802, a variable INET is set to assume the contents of the internet submap 204 (FIG. 2). The contents include a list of network objects and router objects and a list of connections between the network and router objects. Block 1802 transfers to block 1804. At block 1804, a variable NETOBJ is set to assume the value of the object identifier OBJID. The OBJID is retrieved from the OBJINFO. Block 1804 transfers to block 1806. At block 1806, a determination is made as to whether NETOBJ is in INET, i.e., whether the object to be changed resides within the internet submap 1804 (FIG. 2). If so, then the block 1806 transfers to the block 1808, which adds the network pertaining to the NETOBJ to a list SYMCHANGELIST. If not, then the block 1806 transfers to the block 1810, which adds the network pertaining to the NETOBJ to a list NEWSYMLIST. The list SYMCHANGELIST and NEWSYMLIST are ultimately forwarded by the translator 318 to the GUI 322 during the batch transfer therebetween.

Figure 19:
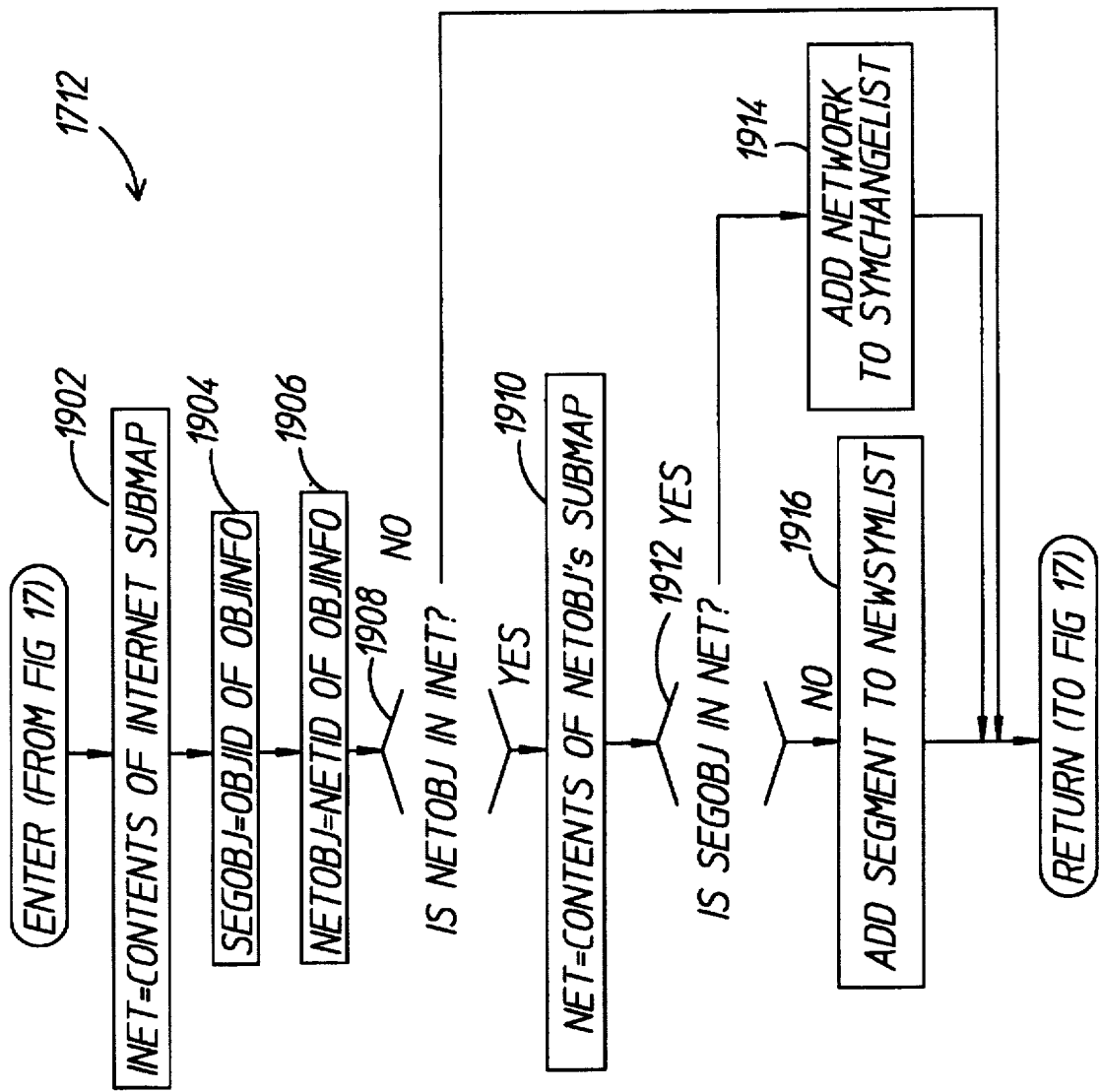
FIG. 19 is a flow chart illustrating the architecture and functionality of a handle segment change block of FIG. 17.

FIG. 19 shows a flow chart of the architecture and functionality of a preferred embodiment for implementing the segment change block 1712 (FIG. 17). In this flow chart, segment changes are determined and computed. With reference to FIG. 19, block 1902 sets a variable INET to assume the contents of the internet submap 204 (FIG. 2). The contents include a list of network and router objects and a list of connections between the network and router objects. Block 1902 transfers to block 1904. At block 1904, a variable SEGOBJ is set to assume the current object identifier OBJID, which is retrieved from the object information OBJINFO. Block 1904 transfers to block 1906. At block 1906, a variable NETOBJ is set to the network identifier NETID, which is determined from the OBJINFO. Block 1906 transfers to block 1908. At block 1908, a determination is made as to whether NETOBJ is in the INET, i.e., whether the current network is within the current internet submap 204 (FIG. 2). If not, then the flow chart of FIG. 19 terminates. If so, then the block 1902 transfers to 1910. At block 1910, a variable NET is set to assume the contents of the network submap 206 (FIG. 2) pertaining to NETOBJ. The contents include, for example but not limited to, a list of segment and connector objects and connections between segments and connectors. Block 1910 transfers to block 1912. At block 1912, a determination is made as to whether SEGOBJ is in the NET (i.e., is the segment in the network submap?). If so, then the block 1912 transfers to the block 1914, which adds the segment pertaining to SEGOBJ to the SYMCHANGELIST. Otherwise, if not, block 1912 transfers to block 1916, which adds the segment pertaining to SEGOBJ to NEWSYMLIST. Finally, after blocks 1914, 1916, the flow chart of FIG. 19 terminates and operation transfers back to FIG. 17.

Figure 20:
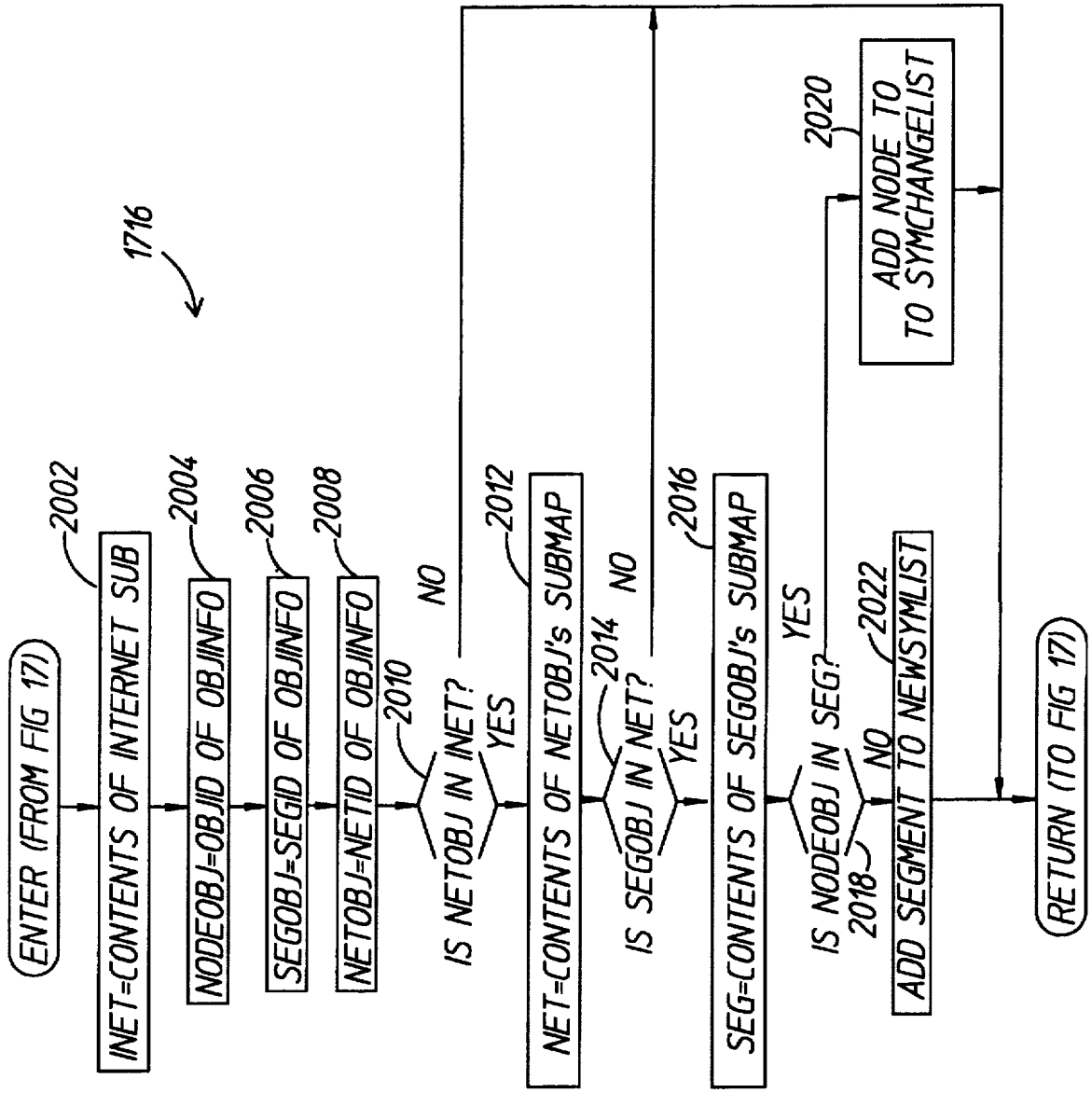
FIG. 20 is a flow chart illustrating the architecture and functionality of a handle node change block of FIG. 17.

FIG. 20 shows the flow chart of the architecture and functionality of a preferred embodiment for implementing the node change block 1716 (FIG. 17). In the flow chart of FIG. 20, node changes are determined and computed by the translator 318. As shown in FIG. 20, block 2002 sets a variable INET to assume the contents of the internet submap 204 (FIG. 2). The contents include a list of network and router objects and a list of connections between the network and router objects. Block 2002 transfers to block 2004. At block 2004, a variable NODEOBJ is set to assume the object identifier OBJID contained in the object information OBJINFO. Block 2004 transfers to block 2006. At block 2006, a variable SEGOBJ is set to assume the segment identifier SEGID contained within the OBJINFO. Block 2006 transfers to block 2008. At block 2008, a variable NETOBJ is set to assume the network identifier NETID contained within the OBJINFO. Block 2006 transfers to block 2010. At block 2010, a determination is made as to whether the NETOBJ is in the INET (i.e., is the network in the internet submap?). If not, then the flow chart terminates. If so, then the block 2010 transfers to the block 2012. At block 2012, the variable NET is set to assume the contents of the network submap 206 (FIG. 2) pertaining to NETOBJ. The contents include, for example but not limited to, a list of segments, connectors, and connections between segments and connectors. Block 2012 transfers to block 2014. At block 2014, an inquiry is made as to whether SEGOBJ is in the NET. If not, then the flow chart terminates. If so, then the block 2014 transfers to the block 2016. At block 2016, the variable SEG is set to assume the contents of the segment submap 208 (FIG. 2) pertaining to SEGOBJ. The contents include, for example but not limited to, a list of nodes and connections between the nodes and the network. Block 2016 transfers to block 2018. At block 2018, an inquiry is made as to whether NODEOBJ is in SEG, i.e., whether the node object is in the present segment at issue. If so, then the block 2018 transfers to block 2020, which adds the node pertaining to NODEOBJ to SYMCHANGELIST and then the flow chart terminates. Otherwise, if not, the block 2018 transfers to the block 2022 which adds the node pertaining to NODEOBJ to NEWSYMLIST and then the flow chart terminates.

Figure 21A:
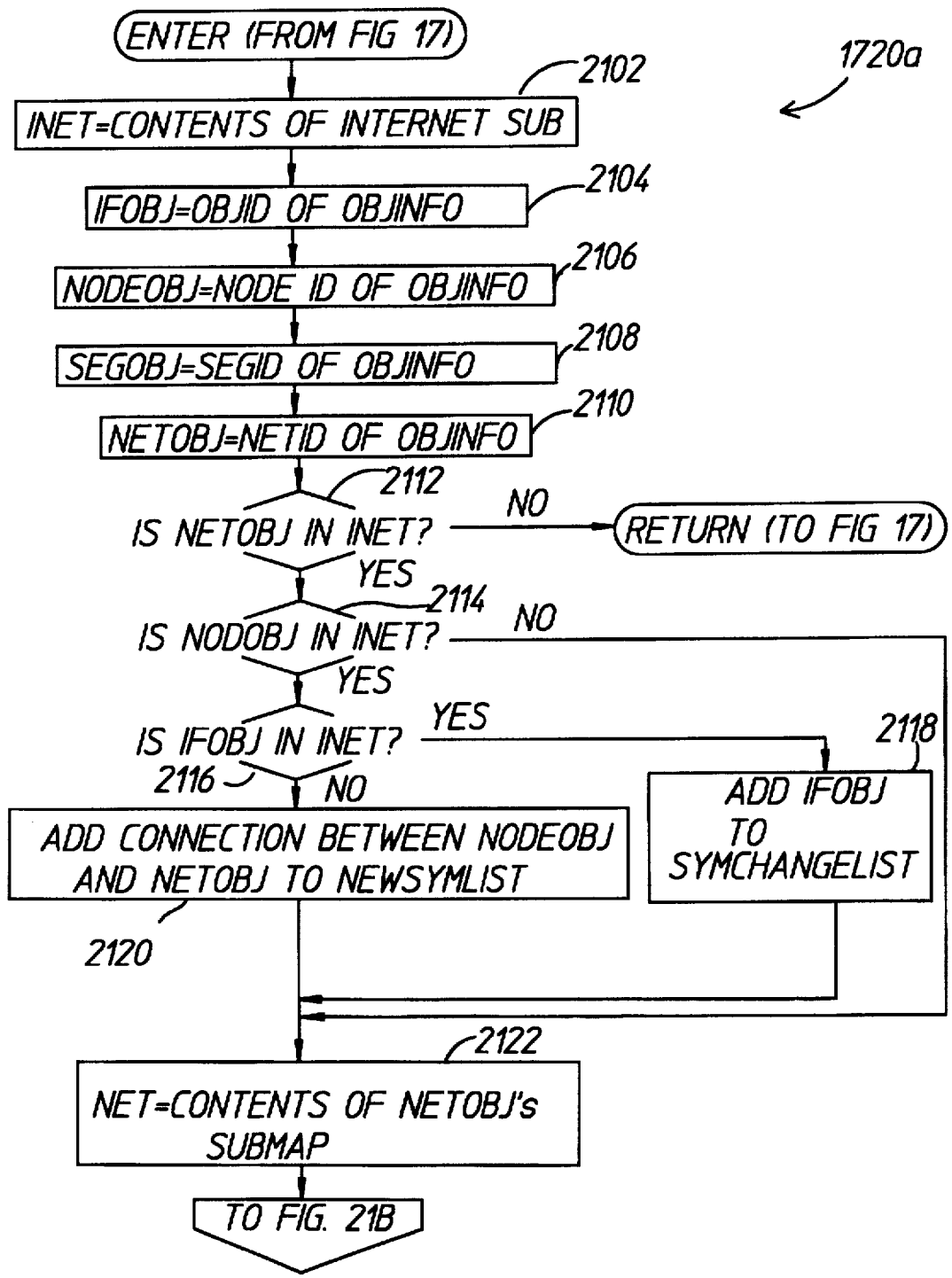
FIG. 21A, FIG. 21B and FIG. 21C show a flow chart illustrating the architecture and functionality of a handle interface change block of FIG. 17.
Figure 21B:
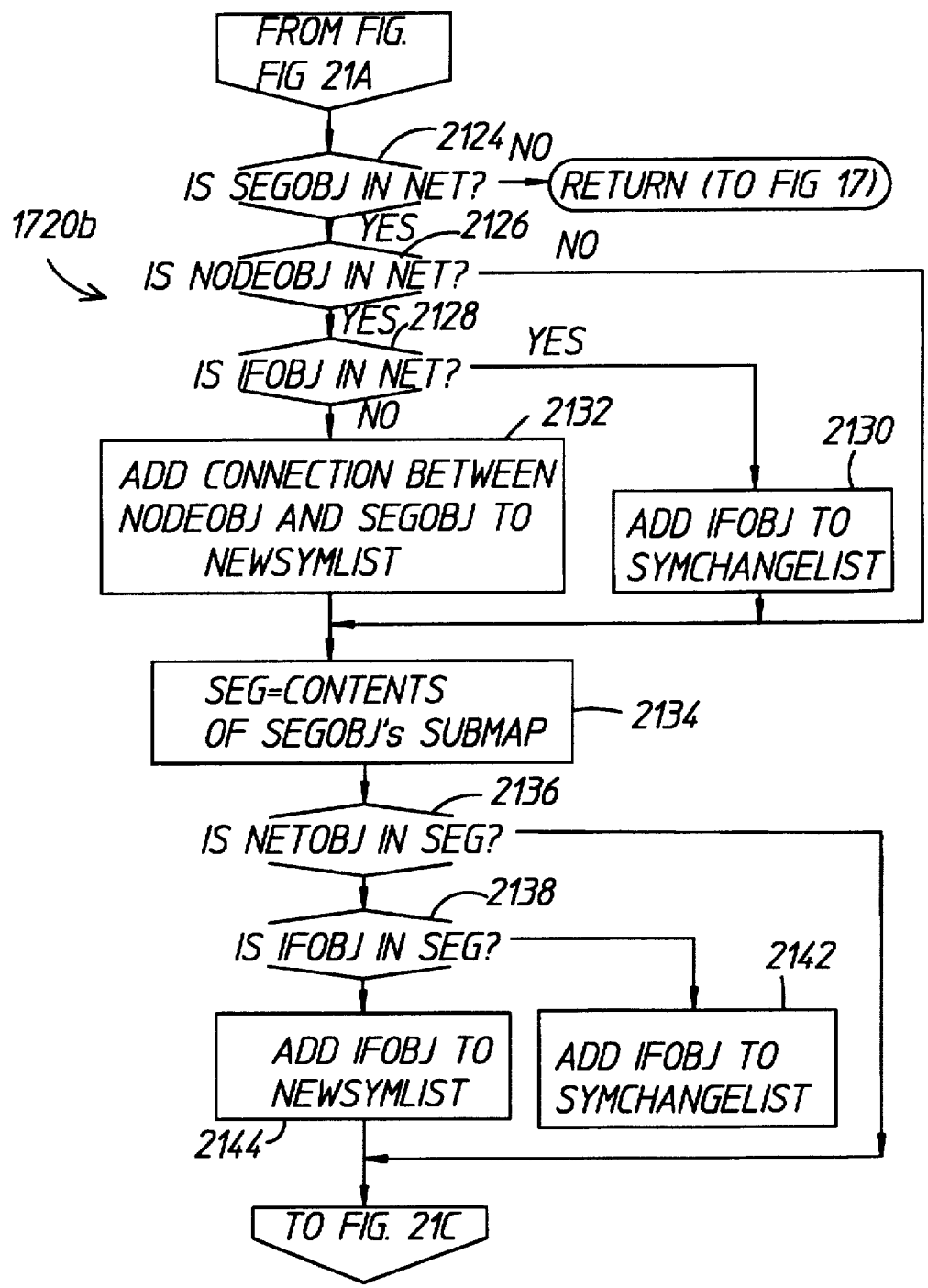
Figure 21C:
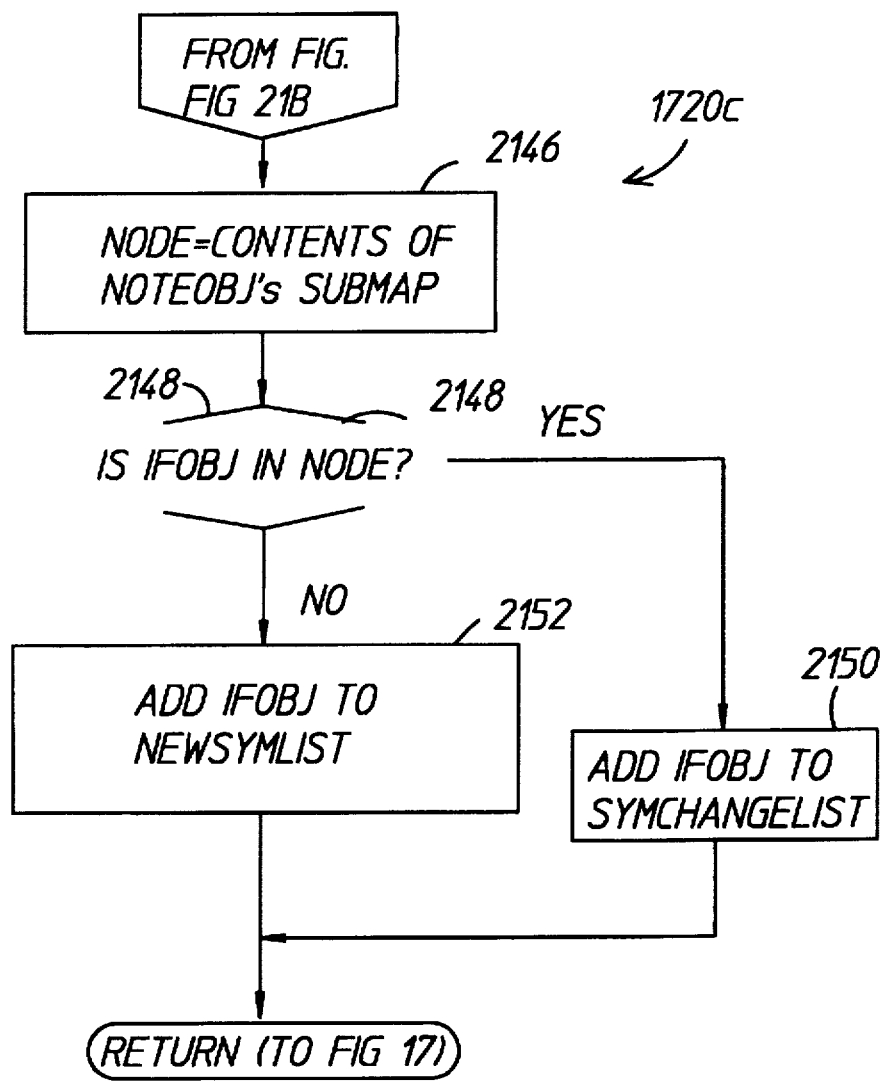

FIGS. 21A through 21C collectively show a flow chart of the architecture and functionality of the preferred embodiment for implementing the interface change block 1720 (FIG. 17). In this flow chart, interface changes in the submaps are determined and computed by the translator 318 (FIG. 3). With reference to FIG. 21A, a block 2102 sets a variable INET to assume the contents of the internet submap 204 (FIG. 2) which is currently at issue. The contents include a list of networks, routers, and connections. Block 2102 transfers to block 2104. At block 2104, a variable IFOBJ is set to assume the OBJID contained within the OBJINFO. The block 2104 transfers to the block 2106. At block 2106, the variable NODEOBJ is set to assume the NODEID contained within the OBJINFO. Block 2106 transfers to block 2108. At block 2108, the variable SEGOBJ is set to assume the SEGID contained within the OBJINFO. Block 2108 transfers to block 2110. At block 2110, a variable NETOBJ is set to assume the NETID contained within the OBJINFO. After block 2110, the initialization process has been completed and the block 2110 transfers to the block 2112.

At block 2112, a determination is made as to whether the NETOBJ is in INET, i.e., whether the network object is in the current internet submap 204 (FIG. 2). If not, the flow chart terminates, as shown in FIG. 21A. If so, then the block 2112 transfers to block 2114. At block 2114, a determination is made as to whether NODEOBJ is in the INET, i.e., whether the node object is in the internet submap 204 (FIG. 2). If not, then the block 2114 transfers to the block 2122. If so, then the block 2114 transfers to the block 2116.

At block 2116, an inquiry is made as to whether IFOBJ is in INET. If so, then the block 2116 transfers to the block 2118, which adds the interface pertaining to IFOBJ to the SYMCHANGELIST. If not, then the block 2116 transfers to the block 2120, which adds the interface pertaining to IFOBJ (between node object and network object) to NEWSYMLIST.

At block 2122, the variable NET is set to assume the contents of the network submap 206 (FIG. 2). The contents include, for example but not limited to segments, connections, etc. Block 2122 transfers to block 2124 of FIG. 21B.

With reference to FIG. 21B, at block 2124, a determination is made as to whether SEGOBJ is in NET, i.e., whether the segment object is within the network submap 206 (FIG. 2). If not, then the flow chart terminates. If so, then the block 2124 transfers to the block 2126.

At block 2126, a determination is made as to whether NODEOJ is in NET, i.e., whether the node object is within the network submap 206 (FIG. 2). If not, then the flow chart transfers to block 2134. If so, then the block 2126 transfers to the block 2128.

At block 2128, an inquiry is made as to whether IFOBJ is within NET, i.e., whether the interface object is within the network submap 206 (FIG. 2). If so, then the block 2128 transfers to block 2130, which adds the interface pertaining to IFOBJ to SYMCHANGELIST. If not, then the block 2128 transfers to the block 2132, which adds the interface pertaining to IFOBJ (which is between a node object and a segment object) to NEWSYMLIST. The blocks 2130, 2132 transfer to the block 2134, as is shown in FIG. 21B.

At block 2134, the variable SEG is set to assume the contents of the segment submap 208 (FIG. 2). The contents include, for example but not limited to, nodes and connections. Block 2134 transfers to block 2136.

At block 2136, a determination is made as to whether NODEOBJ is in SEG, i.e., whether the node object is within the segment submap 208 (FIG. 2). If not, then the flow chart transfers to block 2146 of FIG. 21B. If so, then the block 2136 transfers to block 2138.

At block 2138, a determination is made as to whether IFOBJ is within SEG, i.e., whether the interface object is within the segment submap 208 (FIG. 2). If so, then the block 2138 transfers to the block 2142, which adds the interface pertaining to IFOBJ to SYMCHANGELIST. If not, then the block 2138 transfers to the block 2144, which adds the interface pertaining to IFOBJ to NEWSYMLIST. The blocks 2142, 2144 are transferred to the block 2146 of FIG. 21C.

With reference to FIG. 21C, at block 2146, the variable NODE is set to assume the contents of the node submap 210 (FIG. 2). The contents include interface objects. Block 2146 transfers to the block 2148.

At block 2148, a determination is made as to whether IFOBJ is within NODE, i.e., whether the interface object is within the node submap 210 (FIG. 2). If so, then the interface pertaining to IFOBJ is added to SYMCHANGELIST, as indicated at block 2150. If not, then the block 2148 transfers to the block 2152, which adds the interface pertaining to IFOBJ to NEWSYMLIST. Finally, after blocks 2150, 2152, the flow chart contained collectively in FIGS. 21A through 21C terminates.

Figure 22:
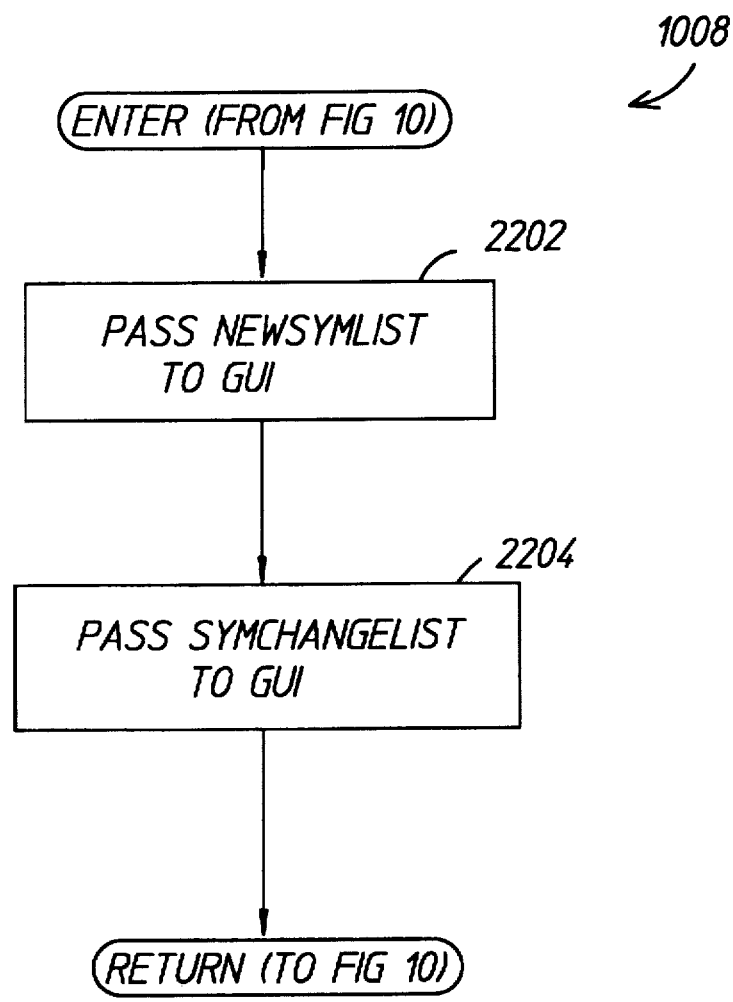
FIG. 22 is a flow chart illustrating the architecture and functionality of an update map block of FIG. 10.

FIG. 22 shows a flow chart of the architecture and functionality of a preferred embodiment for implementing the update map block 1008 (FIG. 10). In this flow chart, a batch transfer of change is sent by the translator 318 to the GUI 322. With reference to FIG. 22, at block 2202, the translator 318 transfers the NEWSYMLIST to the GUI 322, and in block 2204, the translator 318 transfers the SYMCHANGELIST to the GUI 322. After block 2204, the flow chart of FIG. 22 terminates and the operation passes back to block 1010 (FIG. 10).

Figure 23:
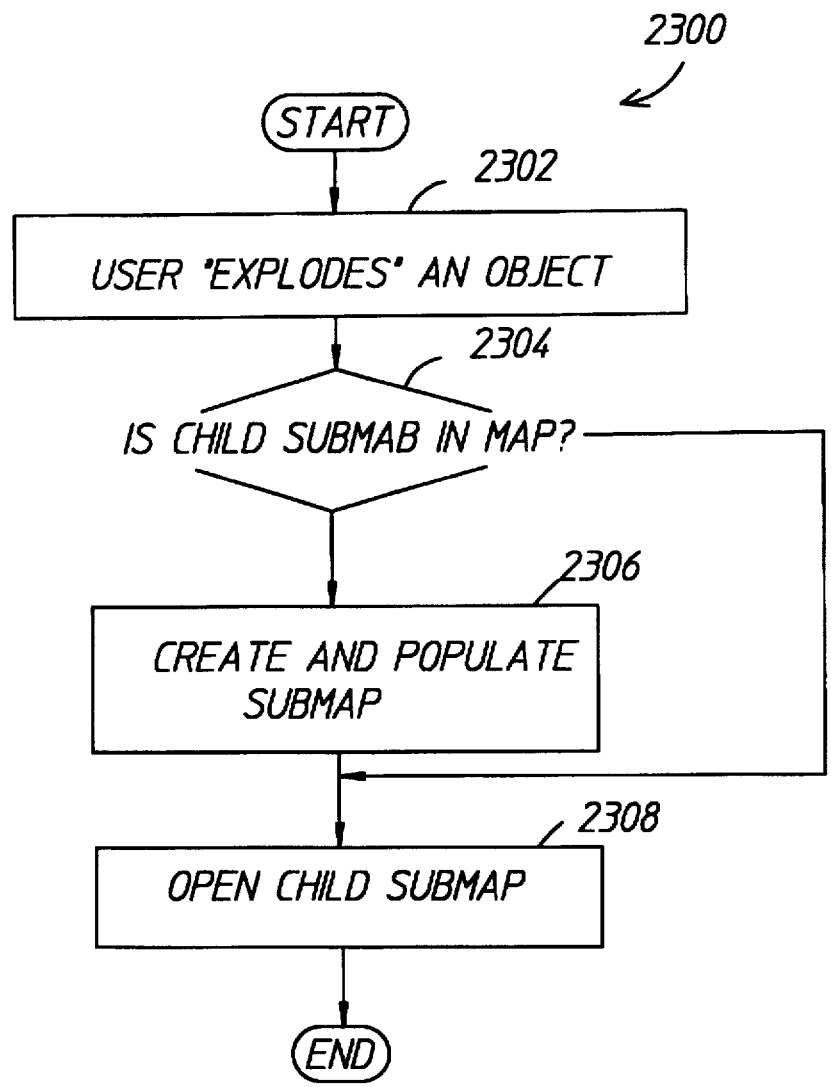
FIG. 23 is a flow chart illustrating the architecture and functionality of an on-demand submap block within the graphical user interface (GUI) of FIGS. 3–5.

FIG. 23 illustrates an on-demand submap module contained within the GUI 322 (FIG. 3). This flow chart implements the user interface to the various submaps of the map 200 (FIG. 2). With reference to FIG. 23, at a block 2302, the GUI 322 monitors the input devices connected to the management station 100 (FIG. 1), for instance, the input device 106. When the user of the management station 100 prompts the management station 100 via the input device 106 or some other input device to explode an object on the display 108, the block 2302 of FIG. 23 transfers to the block 2304 in order to process the user request. At block 2304, a determination is made as to whether the child submap is contained within the map 200 (FIG. 2). If so, then the block 2304 transfers to the block 2308. If not, then the block 2304 transfers to the block 2306, which creates and populates the submap. The GUI 322 populates the submap by requesting the translator 318 to create and populate a submap based on topology data retrieved from the topology manager 310. Moreover, block 2306 transfers to the block 2308 which opens the child submap and displays the child submap on the display 108 for the user.

In concluding the detailed description, it should be noted that it will be obvious to those skilled in the art that many variations and modifications may be made to the preferred embodiments without substantially departing from the principles of the present invention. All such variations and modifications are intended to be included herein within the scope of the present invention, as set forth in the following claims. Further, in the claims hereafter, the structures, materials, acts, and equivalents of all means-plus-function elements or all step-plus-function elements are intended to include any and all structures, materials, or acts for performing the specified functions in combination with the other claimed elements.

Wherefore, the following is claimed:

1. A management system for efficiently discovering and displaying devices and interconnections of a network, comprising:

a processor;

a memory;

a display;

an interface interconnecting said processor, said memory, and said display and capable of connecting to said network;

a discovery mechanism stored in said memory for driving said processor, said discovery mechanism configured to discover and store topology data indicative of said devices and said interconnections of said network;

a layout mechanism stored in said memory for driving said processor, said layout mechanism configured to receive said topology data from said discovery mechanism, said layout mechanism configured to drive said display based upon said topology data; and a filtering system stored in said memory for driving said processor, said filtering system configured to filter objects within said topology data that pass from said discovery mechanism to said layout mechanism.

2. The system of claim 1, further comprising a library associated with said filtering system, said library configured to specify which of said objects are communicated from said discovery mechanism to said layout mechanism.

3. The system of claim 1, further comprising a second filtering system stored in said memory for driving said processor, said second filtering system configured to filter objects within said topology data that pass from said network to said discovery mechanism.

4. The system of claim 1, further comprising:

a second discovery mechanism stored in said memory for driving said processor, said second discovery mechanism configured to discover and store topology data indicative of said devices and said interconnections of said network; and a second filtering system stored in said memory for driving said processor, said second filtering system configured to filter objects within said topology data that pass between said first and second discovery mechanisms.

5. The system of claim 4, further comprising a third filtering system stored in said memory for driving said processor, said third filtering system configured to filter objects within said topology data that pass from said network to said discovery mechanism.

6. The system of claim 5, further comprising a library in communication with said first, second, and third filtering systems, said library configured to specify which of said objects are communicated through said filtering systems.

7. The system of claim 1, wherein said layout mechanism comprises:

a translator configured to convert said topology data to said map data; and a graphical user interface configured to receive said map data from said translator and to drive said display based upon said map data.

8. The system of claim 5, wherein said translator is configured to generate a plurality of hierarchically arranged submaps from said topology data.

9. The system of claim 8, wherein said hierarchically arranged submaps include an internet submap having at least one network object, at least one network submap associated with said at least one network object and having at least one segment object, at least one segment submap associated with said at least one segment object and having at least one node object, and at least one node submap associated with said at least one node object and having at least one interface object.

10. The system of claim 1, wherein said filtering system includes a boolean expression for determining which of said objects within said topology data pass from said discovery mechanism to said layout mechanism.

11. A management system for efficiently discovering and displaying devices and interconnections of a network, comprising:

a processor;

a memory;

a display;

an interface interconnecting said processor, said memory, and said display and capable of connecting to said network;

a discovery mechanism stored in said memory for driving said processor, said discovery mechanism configured to discover and store topology data indicative of said devices and said interconnections of said network;

a layout mechanism stored in said memory for driving said processor, said layout mechanism configured to receive said topology data from said discovery mechanism, said layout mechanism configured to drive said display based upon said topology data; and a filtering system stored in said memory for driving said processor, said filtering system configured to filter objects within said topology data that pass from said network to said discovery mechanism.

12. The system of claim 11, further comprising a library associated with said filtering system, said library configured to specify which of said objects are communicated from said network to said discovery mechanism.

13. The system of claim 11, wherein said layout mechanism comprises:

a translator configured to convert said topology data to said map data; and a graphical user interface configured to receive said map data from said translator and to drive said display based upon said map data.

14. The system of claim 13, wherein said translator is configured to generate a plurality of hierarchically arranged submaps from said topology data.

15. The system of claim 14, wherein said hierarchically arranged submaps include an internet submap having at least one network object, at least one network submap associated with said at least one network object and having at least one segment object, at least one segment submap associated with said at least one segment object and having at least one node object, and at least one node submap associated with said at least one node object and having at least one interface object.

16. The system of claim 11, wherein said filtering system includes a boolean expression for determining which of said objects within said topology data pass from said network to said discovery mechanism.

17. A management system for efficiently discovering and displaying devices and interconnections of a network, comprising:

a processor;

a memory;

a display;

an interface interconnecting said processor, said memory, and said display and capable of connecting to said network;

first and second discovery mechanisms stored in said memory for driving said processor, said first and second discovery mechanisms configured to discover and store topology data indicative of said devices and said interconnections of said network;

a layout mechanism stored in said memory for driving said processor, said layout mechanism configured to receive said topology data from said discovery mechanism, said layout mechanism configured to drive said display based upon said topology data; and a filtering system stored in said memory for driving said processor, said filtering system configured to filter objects within said topology data that pass between said first and second discovery mechanisms.

18. The system of claim 17, further comprising a library associated with said filtering system, said library configured to specify which of said objects are communicated between said first and second discovery mechanisms.

19. The system of claim 17, wherein said layout mechanism comprises:

a translator configured to convert said topology data to said map data; and a graphical user interface configured to receive said map data from said translator and to drive said display based upon said map data.

20. The system of claim 19, wherein said translator is configured to generate a plurality of hierarchically arranged submaps from said topology data.

21. The system of claim 20, wherein said hierarchically arranged submaps include an internet submap having at least one network object, at least one network submap associated with said at least one network object and having at least one segment object, at least one segment submap associated with said at least one segment object and having at least one node object, and at least one node submap associated with said at least one node object and having at least one interface object.

22. The system of claim 17, wherein said filtering system includes a boolean expression for determining which of said objects within said topology data pass between said first and second discovery mechanisms.

23. A filtering system for discovering and displaying devices and interconnections of a network, comprising:

means for generating topology data indicative of said devices and said interconnections of said network;

means for comparing objects within said topology data with a predefined library to determine allowable objects and nonallowable objects;

means for converting said allowable objects into map data and displaying said map data; and means for refraining from converting said nonallowable objects into map data and from displaying said map data.

24. A filtering system for discovering and displaying devices and interconnections of a network, comprising:

means for generating topology data indicative of said devices and said interconnections of said network;

means for comparing objects within said topology data with a predefined library to determine allowable objects and nonallowable objects;

means for converting said allowable objects into map data and displaying said map data; and means for eliminating said nonallowable objects from said topology data.

25. A filtering system for discovering and displaying devices and interconnections of a network, comprising:

first and second discovery means for generating topology data indicative of said devices and said interconnections of said network;

means for communicating objects within said topology data between said first and second discovery means;

means for comparing said objects that are communicated between said first and second discovery means with a predefined library to determine allowable objects and nonallowable objects; and means for preventing transfer of said nonallowable objects between said first and second discovery means, while permitting transfer of said allowable objects therebetween.

26. A computer-readable medium in a management station comprising a program for discovering and displaying devices and interconnections of a network, said program comprising:

a discovery mechanism configured to discover and store topology data indicative of said devices and said interconnections of said network;

a layout mechanism configured to receive said topology data from said discovery mechanism, said layout mechanism configured to drive said display based upon said topology data; and a filtering system configured to filter objects within :said topology data that pass from said discovery mechanism to said layout mechanism.

27. A computer-readable medium in a management station comprising a program for discovering and displaying devices and interconnections of a network, said program comprising:

a discovery mechanism configured to discover and store topology data indicative of said devices and said interconnections of said network;

a layout mechanism configured to receive said topology data from said discovery mechanism, said layout mechanism configured to drive said display based upon said topology data; and a filtering system configured to filter objects within said topology data that pass from said network to said discovery mechanism.

28. A computer-readable medium in a management station comprising a program for discovering and displaying devices and interconnections of a network, said program comprising:

first and second discovery mechanisms configured to discover and store topology data indicative of said devices and said interconnections of said network;

a layout mechanism configured to receive said topology data from said first and second discovery mechanisms, said layout mechanism configured to drive said display based upon said topology data; and a filtering system configured to filter objects within said topology data that pass between said first and second discovery mechanisms.

29. A filtering method for discovering and displaying devices and interconnections of a network, comprising the steps of:

generating topology data indicative of said devices and said interconnections of said network;

comparing objects within said topology data with a predefined library to determine allowable objects and nonallowable objects;

converting said allowable objects into map data and displaying said map data; and refraining from converting said nonallowable objects into map data and from displaying said map data.

30. A filtering method for discovering and displaying devices and interconnections of a network, comprising the steps of:

generating topology data indicative of said devices and said interconnections of said network;

comparing objects within said topology data with a predefined library to determine allowable objects and nonallowable objects;

converting said allowable objects into map data and displaying said map data; and eliminating said nonallowable objects from said topology data.

31. A filtering method for discovering and displaying devices and interconnections of a network, comprising the steps of:

generating topology data indicative of said devices and said interconnections of said network with first and second discovery mechanisms that are interfaced to said network;

communicating objects within said topology data between said first and second discovery mechanisms;

comparing said objects that are communicated between said first and second discovery mechanisms with a predefined library to determine allowable objects and nonallowable objects; and preventing transfer of said nonallowable objects between said first and second discovery mechanisms, while permitting transfer of said allowable objects therebetween.

* * * * *